(12) United States Patent
Sugiura et al.

(10) Patent No.: US 9,879,336 B2
(45) Date of Patent: Jan. 30, 2018

(54) COLD ROLLED STEEL SHEET, ELECTROGALVANIZED COLD-ROLLED STEEL SHEET, HOT-DIP GALVANIZED COLD-ROLLED STEEL SHEET, ALLOYED HOT-DIP GALVANIZED COLD ROLLED STEEL SHEET, AND MANUFACTURING METHODS OF THE SAME

(71) Applicant: NIPPON STEEL & SUMITOMO METAL CORPORATION, Tokyo (JP)

(72) Inventors: Natsuko Sugiura, Tokyo (JP); Shigeru Yonemura, Tokyo (JP); Naoki Maruyama, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 99 days.

(21) Appl. No.: 14/417,761

(22) PCT Filed: Jul. 31, 2013

(86) PCT No.: PCT/JP2013/070745
§ 371 (c)(1),
(2) Date: Jan. 27, 2015

(87) PCT Pub. No.: WO2014/021382
PCT Pub. Date: Feb. 6, 2014

(65) Prior Publication Data
US 2015/0203948 A1    Jul. 23, 2015

(30) Foreign Application Priority Data

Jul. 31, 2012 (JP) ................................. 2012-170316

(51) Int. Cl.
*C22C 38/00* (2006.01)
*C23C 2/02* (2006.01)
(Continued)

(52) U.S. Cl.
CPC .............. *C23C 2/02* (2013.01); *B32B 15/013* (2013.01); *C21D 8/0226* (2013.01);
(Continued)

(58) Field of Classification Search
CPC .. C21D 8/0226; C21D 8/0263; C21D 8/0405; C21D 8/0436; C21D 8/0447;
(Continued)

(56) References Cited

U.S. PATENT DOCUMENTS 3,918,999 A * 11/1975 Sekine ................. C21D 8/0226
148/500
4,973,367 A    11/1990 Matsuoka et al.
(Continued)

FOREIGN PATENT DOCUMENTS

EP    1 002 886 A1    5/2000
EP    2 508 640 A1    10/2012
(Continued)

OTHER PUBLICATIONS

Extended European Search Report, dated Mar. 15, 2016, for corresponding European Application No. 13826234.0.
(Continued)

*Primary Examiner* — Colleen Dunn
*Assistant Examiner* — Nicholas Wang
(74) *Attorney, Agent, or Firm* — Birch, Stewart, Kolasch & Birch, LLP

(57) ABSTRACT

A cold-rolled steel sheet containing: in mass %, C: 0.0005 to 0.0045%; Mn: 0.80 to 2.50%; Ti: 0.002 to 0.150%; B: 0.0005 to 0.01%, in which (1) Expression is satisfied, and a balance being composed of iron and impurities, in which at the position of ¼ thickness of a sheet thickness, a random intensity ratio (A) of the {332}<110> orientation is 3 or less, a random intensity ratio (B) of the {557}<9 16 5> orientation and a random intensity ratio (C) of the {111}<112>
(Continued)

orientation are both 7 or more, and {(B)/(A)≥5} and {(B)>(C)} are satisfied.

9 Claims, 1 Drawing Sheet

(51) Int. Cl.
| | |
|---|---|
| C23C 2/06 | (2006.01) |
| C23C 2/28 | (2006.01) |
| C23C 2/40 | (2006.01) |
| C21D 9/48 | (2006.01) |
| C22C 38/14 | (2006.01) |
| B32B 15/01 | (2006.01) |
| C22C 38/02 | (2006.01) |
| C22C 38/04 | (2006.01) |
| C22C 38/06 | (2006.01) |
| C22C 38/12 | (2006.01) |
| C25D 5/36 | (2006.01) |
| C25D 7/06 | (2006.01) |
| C21D 8/04 | (2006.01) |
| C21D 8/02 | (2006.01) |
| C21D 9/46 | (2006.01) |
| C22C 38/08 | (2006.01) |
| C22C 38/18 | (2006.01) |
| C22C 38/22 | (2006.01) |
| C22C 38/26 | (2006.01) |
| C22C 38/28 | (2006.01) |
| C22C 38/32 | (2006.01) |
| C22C 38/38 | (2006.01) |

(52) U.S. Cl.
CPC ......... *C21D 8/0263* (2013.01); *C21D 8/0405* (2013.01); *C21D 8/0436* (2013.01); *C21D 8/0447* (2013.01); *C21D 8/0463* (2013.01); *C21D 8/0473* (2013.01); *C21D 9/46* (2013.01); *C21D 9/48* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/38* (2013.01); *C23C 2/06* (2013.01); *C23C 2/28* (2013.01); *C23C 2/40* (2013.01); *C25D 5/36* (2013.01); *C25D 7/0614* (2013.01); *Y10T 428/12799* (2015.01)

(58) Field of Classification Search
CPC ...... C21D 8/0463; C21D 8/0473; C21D 9/46; C21D 9/48; C25D 5/36; C25D 7/0614; Y10T 428/12799; C23C 2/40
See application file for complete search history.

(56) References Cited

U.S. PATENT DOCUMENTS

| | | | |
|---|---|---|---|
| 6,322,639 | B1 | 11/2001 | Matsuzaki et al. |
| 2001/0039983 | A1* | 11/2001 | Inoue .................. C21D 8/0226 148/579 |
| 2003/0168137 | A1* | 9/2003 | Chikushi .................. B21B 1/26 148/648 |
| 2010/0047617 | A1* | 2/2010 | Sugiura .................. C21D 6/005 428/659 |

FOREIGN PATENT DOCUMENTS

| | | | |
|---|---|---|---|
| JP | 2-263933 | A | 10/1990 |
| JP | 5-255804 | A | 10/1993 |
| JP | 10-280090 | A | 10/1998 |
| JP | 2000-104144 | A | 4/2000 |
| JP | 2003-183775 | A | 7/2003 |
| JP | 2005-120459 | A | 5/2005 |
| JP | 2005120459 | * | 5/2005 |
| JP | 2005-298964 | A | 10/2005 |
| JP | 2005120459 | * | 12/2005 |
| JP | 2006-183130 | A | 7/2006 |
| JP | 2007-92128 | A | 4/2007 |
| JP | 2007-146275 | A | 6/2007 |
| JP | 2008-240123 | A | 10/2008 |
| JP | 2008-240125 | A | 10/2008 |
| JP | 2009-13478 | A | 1/2009 |
| JP | 2009-19265 | A | 1/2009 |
| WO | WO 2011/065591 | A1 | 6/2011 |

OTHER PUBLICATIONS

International Search Report, dated Oct. 15, 2013, issued in PCT/JP2013/070745.
Written Opinion of the International Searching Authority, dated Oct. 15, 2013, issued in PCT/JP2013/070745.

* cited by examiner

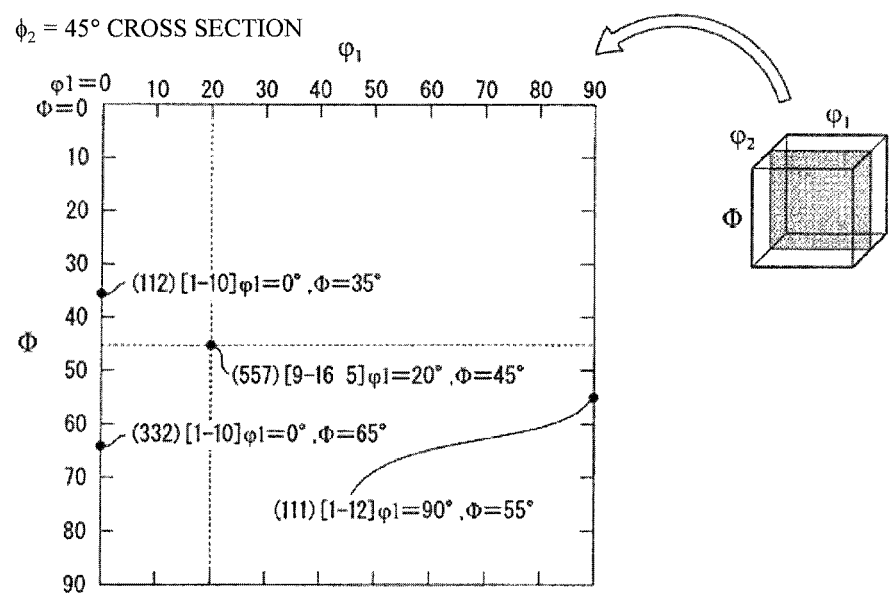

COLD ROLLED STEEL SHEET, ELECTROGALVANIZED COLD-ROLLED STEEL SHEET, HOT-DIP GALVANIZED COLD-ROLLED STEEL SHEET, ALLOYED HOT-DIP GALVANIZED COLD ROLLED STEEL SHEET, AND MANUFACTURING METHODS OF THE SAME

TECHNICAL FIELD

The present invention relates to a cold-rolled steel sheet excellent in rigidity and deep drawability, an electrogalvanized cold-rolled steel sheet, a hot-dip galvanized cold-rolled steel sheet, an alloyed hot-dip galvanized cold-rolled steel sheet, and manufacturing methods of the same.

BACKGROUND ART

In the field of automobiles, in terms of improvement of fuel efficiency, there is a growing need for a weight reduction of vehicle body, and in terms of securing collision safety, various high-strength steel sheets are applied to automobile members. However, even when yield strength and tensile strength of a steel product are improved by using a strengthening mechanism such as structure strengthening or a grain refining effect, a Young's modulus does not change. Therefore, when a sheet thickness of a steel sheet is thinned for weight reduction, member rigidity is decreased, so that it becomes difficult to achieve sheet thinning.

On the other hand, the Young's modulus of iron is 206 GPa or so generally, but it is, possible to increase a Young's modulus in a specific direction by controlling a crystal orientation (texture) of a polycrystalline iron. There have been made many inventions with regard to a steel sheet in which a Young's modulus in a direction perpendicular to a rolling direction (to be referred to as a transverse direction, hereinafter) is increased by increasing the integration degree to the {112}<110> orientation, for example, so far. However, the {112}<110> orientation is an orientation to significantly decrease r values in the rolling direction and in the transverse direction, so that there is a problem that deep drawability deteriorates significantly. Further, the Young's modulus in a rolling 45° direction decreases more than that of a normal steel sheet, so that the steel sheets can be applied only to a member long in one direction such as a frame member, and there is a problem that they cannot be applied to, for example, a panel member and a member required to have Young's modulus in plural directions such as torsional rigidity.

Patent Documents 1 to 4 are each related to an orientation group including {112}<110> or a steel sheet in which an orientation group including {112}<110> is developed. Patent Documents 1 to 4 are each related to a technique in which a high Young's modulus is obtained in a transverse direction and a certain direction of a member is suited to the transverse direction, thereby making it possible to increase rigidity in the direction. However, in each of Patent Documents 1 to 4, there is no description other than the Young's modulus in the transverse direction. Patent Document 3 among them is one related to a high-strength steel with ductility and a Young's modulus both achieved, but has no description on deep drawability. Further, Patent Document 4 is one related to a steel sheet excellent in hole expandability being one of indices of workability and in a Young's modulus, but has no description on deep drawability.

Further, some of the present inventors and the like have disclosed a hot-rolled steel sheet having a high Young's modulus in a rolling direction, a cold-rolled steel sheet, and manufacturing methods of the same (see Patent Documents 5 and 6, for example). These Patent Documents 5 and 6 are a technique of increasing Young's modulus in a rolling direction and in a rolling perpendicular direction by using the {110}<111> orientation and the {112}<111> orientation. However, with regard also to the steel sheets described in these respective Patent documents, there are descriptions on hole expandability and ductility, but there is no description on deep drawability.

Further, Patent Document 7 discloses a technique of increasing Young's modulus in a rolling direction and in a transverse direction of a cold-rolled steel sheet, but has no description on deep drawability.

Further, Patent Document 8 discloses a technique of increasing a Young's modulus and deep drawability by using an ultralow carbon steel. However, the technique described in Patent Document 8 has a problem that due to performing rolling with the total reduction amount of 85% or more in a temperature range of Ar3 to Ar3+150° C. or lower, and the like, a load on a rolling mill is high. Further, Patent Document 8 is not the one capable of obtaining significant rigidity at all because the Young's modulus in a 45° direction is not necessarily high and a crystal orientation to be developed is not also proper.

PRIOR ART DOCUMENT

Patent Document

Patent Document 1: Japanese Laid-open Patent Publication No. 2006-183130
Patent Document 2: Japanese Laid-open Patent Publication No. 2007-92128
Patent Document 3: Japanese Laid-open Patent Publication No. 2008-240125
Patent Document 4: Japanese Laid-open Patent Publication No. 2008-240123
Patent Document 5: Japanese Laid-open Patent Publication No. 2009-19265
Patent Document 6: Japanese Laid-open Patent Publication No. 2007-146275
Patent Document 7: Japanese Laid-open Patent Publication No. 2009-13478
Patent Document 8: Japanese Laid-open Patent Publication No. 05-255804

DISCLOSURE OF THE INVENTION

Problems to be Solved by the Invention

The present invention has been made in consideration of the above-described problems, and has an object to provide a cold-rolled steel sheet whose Young's modulus in all directions are increased as compared to a conventional product and whose rigidity and deep drawability are excellent, an electrogalvanized cold-rolled steel sheet, a hot-dip galvanized cold-rolled steel sheet, an alloyed hot-dip galvanized cold-rolled steel sheet, and manufacturing methods of the same.

Means for Solving the Problems

The present inventors performed earnest examinations in order to solve the above-described problems. As a result, they learned that to a steel whose added amount of C is decreased and whose amount of solid-solution C is further decreased as much as possible by adding Nb and Ti thereto, Mn, P, and B are further added in proper ranges and hot rolling conditions are optimized, thereby making it possible to improve rigidity and deep drawability of a cold-rolled steel sheet. That is, they found that by employing the above-described condition, during cold rolling and annealing to be performed later, the Young's modulus are increased, {557}<9 16 5> being an orientation with a relatively high r value is developed, and the {332}<110> orientation being an orientation to decrease the Young's modulus in a rolling direction is decreased, thereby making it possible to obtain excellent rigidity and deep drawability.

The present invention is the cold-rolled steel sheet excellent in rigidity and deep drawability, the electrogalvanized cold-rolled steel sheet, the hot-dip galvanized cold-rolled steel sheet, the alloyed hot-dip galvanized cold-rolled steel sheet, and the manufacturing methods of the same as described above, and the gist thereof is as follows.

[1] A cold-rolled steel sheet, contains:
in mass %,
C: 0.0005 to 0.0045%;
Mn: 0.80 to 2.50%;
Ti: 0.002 to 0.150%;
B: 0.0005 to 0.01%;
Si: 0 to 1.0%;
Al: 0 to 0.10%;
Nb: 0 to 0.040%;
Mo: 0 to 0.500%;
Cr: 0 to 3.000%;
W: 0 to 3.000%;
Cu: 0 to 3.000%;
Ni: 0 to 3.000%;
Ca: 0 to 0.1000%;
Rem: 0 to 0.1000%;
V: 0 to 0.100%;
P: 0.15% or less;
S: 0.010% or less;
N: 0.006% or less,
in which (1) Expression below is satisfied, and
a balance being composed of iron and impurities, in which at the position of ¼ thickness of a sheet thickness, a random intensity ratio (A) of the {332}<110> orientation is 3 or less, a random intensity ratio (B) of the {557}<9 16 5> orientation and a random intensity ratio (C) of the {111}<112> orientation are both 7 or more, and {(B)/(A) ≥5} and {(B)>(C)} are satisfied.

$$0.07 \leq (Mn(\text{mass \%}) - Mn^*(\text{mass \%}))/(B(\text{ppm}) - B^*(\text{ppm})) \leq 0.2 \quad (1)$$

(1) Expression above is set as follows.
Mn*(mass %)=55S (mass %)/32
B*(ppm)=10(N (mass %)−14Ti (mass %)/48)/14×10000
In the case of Mn*<0 and B*<0, B* is set to 0.

[2] The cold-rolled steel sheet according to [1], contains:
one or two of, in mass %,
Si: 0.01 to 1.0%; and
Al: 0.010 to 0.10%.

[3] The cold-rolled steel sheet according to [1] or [2], contains:
in mass %,
Nb: 0.005 to 0.040%.

[4] The cold-rolled steel sheet according to any one of [1] to [3], contains:
one or two or more of, in mass %,
Mo: 0.005 to 0.500%;
Cr: 0.005 to 3.000%;
W: 0.005 to 3.000%;
Cu: 0.005 to 3.000%; and
Ni: 0.005 to 3.000%.

[5] The cold-rolled steel sheet according to any one of [1] to [4], contains:
one or two or more of, in mass %,
Ca: 0.0005 to 0.1000%;
Rem: 0.0005 to 0.1000%; and
V: 0.001 to 0.100%.

[6] The cold-rolled steel sheet according to any one of [1] to [5], in which
a Young's modulus in a rolling perpendicular direction is 225 GPa or more, a Young's modulus in a rolling direction and a Young's modulus in a 45° direction with respect to the rolling direction are both 206 GPa or more, and an average r value is 1.4 or more.

[7] An electrogalvanized cold-rolled steel sheet, in which on the surface of the cold-rolled steel sheet according to any one of [1] to [6], electrogalvanizing is performed.

[8] A hot-dip galvanized cold-rolled steel sheet, in which on the surface of the cold-rolled steel sheet according to any one of [1] to [6], hot-dip galvanizing is performed.

[9] An alloyed hot-dip galvanized cold-rolled steel sheet, in which on the surface of the cold-rolled steel sheet according to any one of [1] to [6], alloying hot-dip galvanizing is performed.

[10] A manufacturing method of a cold-rolled steel sheet, includes:
on a steel billet containing:
in mass %,
C: 0.0005 to 0.0045%;
Mn: 0.80 to 2.50%;
Ti: 0.002 to 0.150%;
B: 0.0005 to 0.01%;
Si: 0 to 1.0%;
Al: 0 to 0.10%;
Nb: 0 to 0.040%;
Mo: 0 to 0.500%;
Cr: 0 to 3.000%;
W: 0 to 3.000%;
Cu: 0 to 3.000%;
Ni: 0 to 3.000%;
Ca: 0 to 0.1000%;
Rem: 0 to 0.1000%;
V: 0 to 0.100%;
P: 0.15% or less;
S: 0.010% or less;
N: 0.006% or less,
in which (1) Expression below is satisfied, and
a balance being composed of iron and impurities,
performing heating to 1150° C. or higher, and next performing rolling with a shape ratio (X) determined by (2) Expression below of 4.4 or less for at least one pass or more in a temperature range of 1000 to 950° C. with a finish rolling starting temperature set to 1000 to 1100° C., and next performing rolling with the shape ratio (X) determined by (2) Expression below of 3.0 to 4.2 for at least one pass or more in a temperature range of not lower than a temperature 50° C. lower than an A3 transformation temperature obtained by (3) Expression below nor higher than 950° C., and next starting cooling within 2 seconds after finish of final rolling, cooling the temperature within a range down to 700° C. at an average cooling rate of 15° C./s or more, and then performing coiling in a temperature range of 500 to 650° C., and next performing pickling, and then performing cold rolling at a reduction ratio of 50 to 90%, heating the temperature in a range of room temperature to 650° C. at an average heating rate of 2 to 20° C./s, and further heating the temperature from 650° C. to 700° C. at an average heating rate of 2 to 15° C./s, and next performing annealing to perform holding for 1 second or longer in a temperature range of not lower than 700° C. nor higher than 900° C.

$$0.07 \leq (Mn(\text{mass \%}) - Mn^*(\text{mass \%}))/(B(\text{ppm}) - B^*(\text{ppm})) \leq 0.2 \quad (1)$$

(1) Expression above is set as follows.
Mn*(mass %)=55S (mass %)/32
B*(ppm)=10(N(mass %)−14Ti (mass %)/48)/14×10000
In the case of Mn*<0 and B*<0, B* is set to 0.

$$X \text{ (shape ratio)} = 1 \, d/hm \quad (2)$$

(2) Expression above is set as follows.
ld (contact arc length of hot-rolling roll and steel sheet): √(L×(hin−hout)/2) hm: (hin+hout)/2
L: roll diameter
hin: rolling roll entry side sheet thickness
hout: rolling roll exit side sheet thickness $$A3(° C.) = 937.2 - 476.5C + 56Si - 19.7Mn - 16.3Cu - 26.6Ni - 4.9Cr + 38.1Mo + 136.3Ti - 19.1Nb + 124.8V + 198.4Al + 3315.0B \quad (3)$$

In (3) Expression above, C, Si, Mn, P, Cu, Ni, Cr, Mo, Ti, Nb, V, Al, and B are the contents of the respective elements [mass %]. With regard to a steel sheet in which Si, Al, Cu, Ni, Cr, Mo, Nb, and V are not intended to be contained, it is calculated with content percentages of these each being 0%.

[11] A manufacturing method of an electrogalvanized cold-rolled steel sheet, includes:
performing electrogalvanizing on the surface of the steel sheet manufactured by the method according to [10].

[12] A manufacturing method of a hot-dip galvanized cold-rolled steel sheet, includes:
performing hot-dip galvanizing on the surface of the steel sheet manufactured by the method according to [10].

[13] A manufacturing method of an alloyed hot-dip galvanized cold-rolled steel sheet, includes:
on the surface of the steel sheet manufactured by the method according to [10], performing hot-dip galvanizing, and then further performing a heat treatment for 10 seconds or longer in a temperature range of 450 to 600° C.

Effect of the Invention

According to the cold-rolled steel sheet, the electrogalvanized cold-rolled steel sheet, the hot-dip galvanized cold-rolled steel sheet, the alloyed hot-dip galvanized cold-rolled steel sheet, and the manufacturing methods of the same of the present invention, the above-described constitution makes it possible to obtain a cold-rolled steel sheet whose rigidity is excellent because Young's modulus in both the directions are 206 GPa or more, a Young's modulus in the rolling perpendicular direction is 225 GPa or more, and a static Young's modulus in the rolling direction improves and whose deep drawability is excellent because an average r value is 1.4 or more, an electrogalvanized cold-rolled steel sheet, a hot-dip galvanized cold-rolled steel sheet, or an alloyed hot-dip galvanized cold-rolled steel sheet. Thus, application of the present invention to an automobile member such as a panel member, for example, makes it possible to sufficiently enjoy merits of fuel efficiency improvement and reduction in vehicle body weight associated with sheet thinning of a member achieved by improvement in rigidity in addition to improvement in workability, so that social contributions are immeasurable.

BRIEF DESCRIPTION OF THE DRAWINGS

FIG. 1 is a view to explain a cold-rolled steel sheet excellent in deep drawability being an embodiment of the present invention, an electrogalvanized cold-rolled steel sheet, a hot-dip galvanized cold-rolled steel sheet, an alloyed hot-dip galvanized cold-rolled steel sheet, and manufacturing methods of the same, and is a view showing positions of respective crystal orientations on an ODF (Crystallite Orientation Distribution Function; φ2=45° cross section).

MODE FOR CARRYING OUT THE INVENTION

Hereinafter, there will be explained a cold-rolled steel sheet excellent in rigidity and deep drawability being an embodiment of the present invention, an electrogalvanized cold-rolled steel sheet, a hot-dip galvanized cold-rolled steel sheet, an alloyed hot-dip galvanized cold-rolled steel sheet, and manufacturing methods of the same. Incidentally, this embodiment is to he explained in detail for a better understanding of the spirit of the present invention, and thus is not the one to limit the present invention unless otherwise specified.

Generally, it is known that a Young's modulus and an r value of a steel sheet both rely on crystal orientations and values of them largely change. The present inventor and the like examined a γ fiber ({111}<112> to {111}<110> orientation group) to be well known as an orientation to increase an r value of a steel sheet, and Young's modulus anisotropy of an orientation close to it. Then, the present inventor and the like found that the orientation of {557}<9 16 5> a little deviating from the γ fiber is an orientation where deterioration of the r value is relatively small, Young's modulus in both in-plane directions are high, and the Young's modulus in a transverse direction in particular is increased, and further the {332}<110> orientation is an orientation to decrease the Young's modulus in a rolling direction and in a transverse direction conversely.

Thus, as a result that the present inventor and the like repeated earnest examination on a method of intensifying the {557}<9 16 5> orientation and weakening {332}<110>, the following things were made clear.

That is, a component base with the amount of C decreased to 0.0045% or less and Nb and/or Ti added thereto is limited to a component base in which appropriate amounts of solid-solution Mn and solid-solution B remain, and hot rolling conditions are optimized, and thereby grains of a hot-rolled sheet are refined, the shape of grains of the hot-rolled sheet is made bainitic, and a nucleation site of {557}<9 16 5> during annealing increases, and conversely development of the {332}<110> orientation is suppressed. Further, they newly found that when, on the occasion of cold rolling and annealing of the hot-rolled sheet with strongly developed transformation texture, recovery at the time of annealing is suppressed appropriately due to the existence of solid-solutions Mn and B, the {557}<9 16 5> orientation is more intensified. Further, they found that when a random intensity ratio of {557}<9 16 5> is set to (A) and a random intensity ratio of {332}<110> is set to (B), it is important to satisfy the following expression {(A)/(B)≥5} for achievement of high Young's modulus. Further, the {111}<112> orientation is known as an orientation to increase the r value, and it is important to make a random intensity ratio (C) of the orientation become 7 or more in terms of deep drawability, but when the random intensity ratio (C) is more intensified than the random intensity ratio (A), the Young's modulus in the transverse direction decreases, so that it is also important to satisfy the following expression {(A)>(C)}.

Incidentally, for the Young's modulus described in the present invention, a value obtained by a dynamic oscillation method or a static tensile method may also be used.

[Cold-Rolled Steel Sheet]

The cold-rolled steel sheet of the present invention contains, in mass %, C: 0.0005 to 0.0045%; Mn: 0.80 to 2.50%; Ti: 0.002 to 0.150%; B: 0.0005 to 0.01%; Si: 0 to 1.0%; Al: 0 to 0.10%; Nb: 0 to 0.040%; Mo: 0 to 0.500%; Cr: 0 to 3.000%; W: 0 to 3.000%; Cu: 0 to 3.000%; Ni: 0 to 3.000%; Ca: 0 to 0.1000%; Rem: 0 to 0.1000%; V: 0 to 0.100%; P: 0.15% or less; S: 0.010% or less; N: 0.006% or less, in which (1) Expression below is satisfied, and a balance being composed of iron and impurities, in which at the position of ¼ thickness of a sheet thickness, a random intensity ratio (A) of the {332}<110> orientation is 3 or less, a random intensity ratio (B) of the {557}<9 16 5> orientation and a random intensity ratio (C) of the {111}<112> orientation are both 7 or more, and {(B)/(A)≥5} and {(B)>(C)} are satisfied.

$$0.07 \leq (Mn(\text{mass \%}) - Mn^*(\text{mass \%}))/(B(\text{ppm}) - B^*(\text{ppm})) \leq 0.2 \quad (1)$$

(1) Expression above is set as follows.
Mn*(mass %)=55S (mass %)/32
B*(ppm)=10(N (mass %)−14Ti (mass %)/48)/14×10000
In the case of Mn*<0 and B*<0, B* is set to 0.

[Steel Composition]

Hereinafter, there will be explained reasons for limiting a steel composition in the present invention in further detail. Incidentally, in the following explanation, "%" relating to the steel composition indicates mass % unless otherwise specified.

[Essential Components]

(C: carbon) 0.0005 to 0.0045%

C is an element necessary for improving strength of a steel sheet. However, when C remains in a solid solution state in a hot-rolled sheet, a shear zone is formed in a grain during cold rolling and the {110}<001> orientation to decrease the Young's modulus in the rolling direction develops, so that the content is set to 0.0045% or less. Further, from this viewpoint, the amount of C is desirably set to 0.004% or less, and is further desirably 0.0035% or less. On the other hand, when the amount of C is set to less than 0.0005%, the cost of a vacuum degassing treatment increases too much, and thus the lower limit of C is set to 0.0005%.

(Mn: manganese) 0.80 to 2.50%

Mn is an important element in the present invention. Mn has an effect of increasing hardenability during cold rolling after finish of hot rolling and turning structure of a hot-rolled sheet into bainitic ferrite. Further, Mn is contained with B in a composite manner, and thereby recovery during annealing after cold rolling is suppressed. As above, in worked grains in the γ fiber orientation, of which the recovery is suppressed, {557}<9 16 5> is likely to recrystalize and the Young's modulus improves. Therefore, in the present invention, 0.8% or more of Mn is contained. Further, from this viewpoint, 1.0% or more of Mn is desirably contained.

On the other hand, when greater than 2.5% of Mn is contained, recrystallization is delayed, the {112}<110> orientation develops, and the Young's modulus in the 45° direction deteriorates. Therefore, the upper limit of Mn is set to 2.5%. Further, from this viewpoint, Mn is more desirably set to 2.0% or less, and is still more desirably 1.5% or less.

(Ti: titanium) 0.002 to 0.150%

Ti is an important element contributing to improvement in deep drawability and Young's modulus. Ti forms nitride in a γ phase high-temperature zone, and suppresses recrystallization caused when a γ phase is worked in hot rolling similarly to Nb to be described later. Further, during coiling, Ti precipitates as TiC to thereby decrease the amount of solid-solution C and improve deep drawability in particular. Further, TiN is formed at high temperature, and thereby precipitation of BN is suppressed, and thus solid-solution B can be secured, so that development of a texture favorable for improvement in Young's modulus is promoted. In order to obtain this effect, 0.002% or more of Ti needs to be contained. On the other hand, when 0.150% or more of Ti is contained, a recrystallization temperature increases and workability deteriorates significantly, so that this value is set to the upper limit. Further, from this viewpoint, the amount of Ti is preferably set to 0.100% or less, and is further preferably 0.060% or less.

(B: boron) 0.0005 to 0.01%

B is also an important element in the present invention similarly to Ti. B optimizes hardenability and a microstructure and a texture of a hot-rolled sheet. Further, B is contained with Mn in a composite manner, thereby moderately delaying recovery during annealing after cold rolling to contribute to optimal texture formation. From this viewpoint, 0.0005% or more of B is contained, and 0.001% or more of B is more desirably contained. On the other hand, containing greater than 0.01% of B increases a recrystallization temperature significantly to cause deterioration of workability, so that this value is set to the upper limit. Further, from this viewpoint, the amount of B is desirably set to 0.004% or less, and is further desirably 0.003% or less.

[Optional Components]

In the present invention, in addition to the above-described essential components, the following optional components may also be further contained in predetermined ranges.

For deoxidation, one or both of Si and Al may also be contained.

(Si: silicon) 0 to 1.0%

The lower limit of Si is not defined, but Si is a deoxidixing element, so that 0.01% or more is desirably contained. Further, Si is an element to increase strength by solid-solution strengthening, to thus be contained with the upper limit being 1.0% as usage. When greater than 1.0% of Si is contained, deterioration of workability is caused, so that this value is set to the upper limit. Further, the containing of Si causes a scale flaw that occurs during hot rolling, which is called a Si scale, and further decreases adhesiveness of plating, so that it is more desirably set to 0.8% or less. Further, from this viewpoint, the content of Si is still more desirably 0.6% or less.

(Al: aluminum) 0 to 0.10%

Al is a deoxidation preparing agent, and its lower limit is not limited in particular, but in terms of a deoxidation effect, it is preferably set to 0.010% or more. On the other hand, Al is an element to significantly increase a transformation point, and when greater than 0.10% of Al is added, γ-region rolling becomes difficult to be performed, so that the upper limit is set to 0.10%.

(Nb: niobium) 0 to 0.040%

Further, Nb is more desirably contained in a predetermined range. Nb significantly suppresses recrystallization caused when a γ phase is worked in hot rolling and significantly promotes formation of a worked texture in a γ phase. Further, Nb forms NbC during coiling to decrease solid-solution C to thereby contribute to improvement in deep drawability. From this viewpoint, 0.005% or more of Nb is desirably contained, and 0.015% or more of Nb is more desirably contained. However, when the content of Nb exceeds 0.040%, recrystallization at the time of annealing is suppressed and deep drawability deteriorates. Therefore, the upper limit of the content of Nb is set to 0.04%. Further, from this viewpoint, the content of Nb is more desirably set to 0.03% or less, and is still more desirably 0.025% or less.

Further, in the present invention, as an element for improving steel properties, one or two or more of Mo, Cr, W, Cu, and Ni are more desirably contained. Concretely, one or two or more of Mo of 0.005 to 0.500% and Cr, W, Cu, and Ni each in a range of 0.005 to 3.000% are desirably contained.

(Mo: molybdenum) 0 to 0.500%

Mo is an element improving hardenability and having an effect of increasing strength by forming carbide. Therefore, when Mo is contained, 0.005% or more is desirably contained. On the other hand, when greater than 0.5% of Mo is contained, ductility and weldability are decreased. From this viewpoint, Mo is desirably contained in a range of not less than 0.005% nor more than 0.500% according to need.

(Cr: chromium) 0 to 3.000%

Cr is also an element improving hardenability and having an effect of increasing strength by forming carbide. Therefore, when Cr is contained, 0.005% or more is desirably contained. On the other hand, when greater than 3.000% of Cr is contained, ductility and weldability are decreased. From this viewpoint, Cr is desirably contained in a range of not less than 0.005% nor more than 3.000% according to need.

(W: tungsten) 0 to 3.000%

W is also an element improving hardenability and having an effect of increasing strength by forming carbide. Therefore, when W is contained, 0.005% or more is desirably contained. On the other hand, when greater than 3.000% of W is contained, ductility and weldability are decreased. From this viewpoint, W is desirably contained in a range of not less than 0.005% nor more than 3.000% according to need.

(Cu: copper) 0 to 3.000%

Cu is an element increasing strength of a steel sheet and improving corrosion resistance and removability of scales. Therefore, when Cu is contained, 0.005% or more is desirably contained. On the other hand, when greater than 3.000% of Cu is contained, Cu causes a surface flaw, so that Cu is desirably contained in a range of not less than 0.005% nor more than 3.000% according to need.

(Ni: nickel) 0 to 3.000%

Ni is an element increasing strength of a steel sheet and improving toughness. Therefore, when Ni is contained, 0.005% or more is desirably contained. On the other hand, when greater than 3.000% of Ni is contained, Ni causes ductility deterioration, so that Ni is desirably contained in a range of not less than 0.005% nor more than 3.000% according to need.

(Ca: 0 to 0.1000%, REM: 0 to 0.1000%, and V: 0 to 0.100%)

Further, in the present invention, as an element for obtaining an effect of increasing strength and improving material of a steel sheet, one or two or more of Ca, REM (rare-earth element), and V are further contained preferably.

When the contents of Ca and REM are each less than 0.0005% and the added amount of V is less than 0.001%, the above-described effect is not sometimes obtained sufficiently. On the other hand, when the contents of Ca and REM are each greater than 0.1000% and the content of V is greater than 0.100%, ductility is sometimes impaired. Thus, when Ca, REM, and V are contained, Ca is preferably contained in a range of 0.0005 to 0.1000%, REM is preferably contained in a range of 0.0005 to 0.1000%, and V is preferably contained in a range of 0.001 to 0.100% respectively.

The balance other than the above is Fe and impurities. As the impurities, one contained in a raw material of ore, scrap, and the like and one contained in a manufacturing step can be exemplified. In the present invention, as representative impurities, P, S, N, and the like are exemplified.

(P: phosphorus) 0.15% or less

P is contained in steel as an impurity. The lower limit of P is not limited, but P is an element capable of improving strength inexpensively, so that greater than 0.01% may also be contained. Further, from this viewpoint, 0.02% or more of P is desirably contained. On the other hand, containing 0.15% or more of P causes a secondary working crack, so that 0.15% is set to the upper limit. Further, from this viewpoint, the amount of P is more desirably set to 0.1% or less, and is still more desirably 0.08% or less.

(S: sulfur) 0.010% or less

S is contained in steel as an impurity. S forms MnS to cause deterioration of workability and decrease the amount of solid-solution Mn, so that 0.010% is set to the upper limit. Further, from this viewpoint, the amount of S is further desirably set to 0.008% or less.

(N: nitrogen) 0.006% or less

N is an impurity contained in steel, and its lower limit is not set in particular, but when N is set to less than 0.0005%, the cost of steelmaking increases, so that it is preferably set to 0.0005% or more. On the other hand, N forms TiN with Ti at high temperature and suppresses recrystallization in a γ phase, but when the amount of TiN is increased too much, workability deteriorates, so that the upper limit of N is set to 0.006%. Further, from this viewpoint, the amount of N is set to 0.0040%, and is more preferably set to 0.0020% or less. Incidentally, when N that is equal to or more than the Ti equivalent (48Ti/14) of TiN is contained, remaining N forms BN and the amount of solid-solution B is decreased, resulting in that a hardenability effect and a recovery suppression effect decrease. Therefore, the amount of N is further desirably set to 48Ti/14 or less.

Further, the steel of the present invention may also further contain elements for improving steel properties in addition to the above elements, and further as the balance, iron is contained, and elements to be mixed inevitably such as Sn and As (inevitable impurities) may also be contained.

(Relational expression of the amount of Mn and the amount of B)

Next, there will be explained (1) Expression below being a relational expression of the amount of Mn and the amount of B in detail.

In the present invention, Mn and B are contained in the ranges satisfying the relation expressed by (1) Expression below.

$$0.07 \leq (Mn(\text{mass \%}) - Mn^*(\text{mass \%}))/(B(\text{ppm}) - B^*(\text{ppm}) - B^*(\text{ppm})) \leq 0.2 \qquad (1)$$

However, (1) Expression above is set as follows.

$Mn^*(\text{mass \%}) = 55S(\text{mass \%})/32$ $B^*(\text{ppm}) = 10(N (\text{mass \%}) - 14Ti (\text{mass \%})/48)/14 \times 10000$ In the case of $Mn^* < 0$ and $B^* < 0$, $B^*$ is set to 0.

(1) Expression above expresses the ratio of the amount of solid-solution Mn and the amount of solid-solution B. When solid-solution Mn and solid-solution B coexist, the interaction with dislocation is brought, recovery is delayed, the {557}<9 16 5> orientation develops, and the {332}<110> orientation decreases. However, when the value expressed by (1) Expression above is less than 0.07, an abundance ratio of Mn to B is too small, so that the delay of recovery obtained by the interaction becomes insufficient to cause an increase in the {332}<110> orientation and a decrease in the {557}<9 16 5> orientation, and {111}<112> becomes the main orientation. Therefore, this value being 0.07 is set to the lower limit. From this viewpoint, with regard to the value expressed by (1) Expression above, 0.1 is more desirably set to the lower limit, and 0.11 is still more desirably set to the lower limit. On the other hand, even when the value expressed by (1) Expression above exceeds 0.2, no special effect can be obtained, and further another workability such as ductility decreases. Therefore, this value being 0.2 is set to the upper limit. Further, from this viewpoint, this value is further desirably 0.19 or less.

[Crystal Orientation]

Next, there will be explained crystal orientations of the cold-rolled steel sheet of the present invention.

With regard to the cold-rolled steel sheet of the present invention, at the position of ¼ thickness of a sheet thickness, the random intensity ratio (A) of the {332}<110> orientation is 3 or less, the random intensity ratio (B) of the {557}<9 16 5> orientation and the random intensity ratio (C) of the {111}<112> orientation are both 7 or more, and {(B)/(A)≥5} and {(B)>(C)} are satisfied.

FIG. 1 shows an ODF (Crystallite Orientation Distribution Function) of a φ2=45° cross section where the crystal orientations of the cold-rolled steel sheet of the present invention are shown. Here, with regard to the orientations of crystals, normally, the orientation vertical to a sheet surface is represented as [hkl] or {hkl} and the orientation parallel to a rolling direction is represented as (uvw) or <uvw>. {hkl} and <uvw> are generic terms of equivalent planes, and [hkl] and (uvw) indicate individual crystal planes. That is, in the present invention, a b. c. c. structure is intended, so that for example, (111), (-111), (1-11), (11-1), (-1-11), (-11-1), (1-1-1), and (-1-1-1) planes are equivalent to one another and cannot be distinguished from one another. In such a case, these orientations are referred to as {111} generically.

Incidentally, the ODF is used also for showing orientations of a low symmetric crystal structure, to thus be expressed by φ1=0 to 360°, Φ=0 to 180°, and φ2=0 to 360° in general, and the individual orientations are represented by [hkl](uvw). However, in the present invention, a high symmetric body-centered cubic crystal is intended, so that with regard to Φ and φ2, they are expressed in the range of 0 to 90°. Further, with regard to φ1, its range changes depending on whether or not symmetry due to deformation is considered when calculation is performed, but in the present invention, symmetry is considered and the orientations are expressed by φ1=0 to 90°, and namely in the present invention, a method in which the average value of the same orientations expressed by φ1=0 to 360° is shown on the ODF of 0 to 90° is selected. In this case, [hkl](uvw) and {hkl}<uvw> are synonymous. Thus, for example, the random intensity ratio of (110)[1-11] of the ODF on the φ2=45° cross section shown in FIG. 1 is the random intensity ratio of the {110}<111> orientation.

Here, the random intensity ratios of the {332}<110> orientation, the {557}<9 16 5> orientation, and the {111}<112> orientation may be obtained from a crystallite orientation distribution function (ODF: Orientation Distribution Function) showing a three-dimensional texture calculated by a series expansion method based on plural pole figures among the {110}, {100}, {211}, and {310} pole figures measured by X-ray diffraction. Incidentally, the random intensity ratio is a numerical value obtained by measuring X-ray intensities of a standard sample not having accumulation to a specific orientation and a test sample under the same conditions by X-ray diffractometry or the like and dividing the obtained X-ray intensity of the test sample by the X-ray intensity of the standard sample.

As shown in FIG. 1, {332}<110> that is one of the crystal orientations of the cold-rolled steel sheet of the present invention is expressed by φ1=0°, Φ=65°, and φ2=45° on the ODF. However, measurement errors caused by working of a test piece and setting of a sample sometimes occur, so that the value of the random intensity ratio (A) of the {332}<110> orientation is set to the maximum random intensity ratio in the range of φ1=0 to 2° and Φ=63 to 67° and the upper limit of the value is set to 3. When this value becomes greater than 3.0, the Young's modulus in the transverse direction in particular decreases, so that this value is set to the upper limit. Further, from this viewpoint, (A) is desirably set to 2.0 or less, and is further desirably 1.5 or less. The lower limit of the value of the random intensity ratio (A) is not defined in particular, but the value of less than 0 is meaningless in principle, so that this value is set to the lower limit.

Further, the {557}<9 16 5> orientation is expressed by φ1=20°, Φ=45°, and φ2=45° on the ODF. As described above, in the present invention, in consideration of the measurement errors caused by working of a test piece and the like, the value of the random intensity ratio (B) of the {557}<9 16 5> orientation is set to the maximum random intensity ratio in the range of φ1=18 to 22° and Φ=43 to 47° and the lower limit of the value is set to 7. Further, from this viewpoint, the value of the random intensity ratio (B) is more desirably 9 or more, and is still more desirably 11 or more. This orientation is a favorable orientation capable of improving the Young's modulus in both the directions to 220 GPa or more, so that the upper limit of the random intensity ratio (B) is not set, but the random intensity ratio becoming 30 or more indicates that all the orientations of crystal arains in the steel sheet are aligned, namely the steel sheet is turned into a single crystal, and deterioration of workability and the like might be caused, so that it is desirably set to less than 30.

Further, the {111}<112> orientation is expressed by φ1=90°, Φ=55°, and φ2=45° on the ODF. In the present invention, in consideration of the measurement errors caused by working of a test piece and the like described above, the value of the random intensity ratio (C) of the {111}<112> orientation is set to the maximum random intensity ratio in the range of φ1=88 to 90° and Φ=53 to 57° and the lower limit of the value is set to 7. When this value is less than 7, a high average r value cannot be obtained. However, when the value of the random intensity ratio (C) is higher than that of the random intensity ratio (B), the Young's modulus in the transverse direction decreases, so that the relation of {(B)>(C)} is established. Further, from this viewpoint, the relation of {(B)>1.2(C)} is more desirably satisfied.

Further, the random intensity ratio (A) of the {332}<110> orientation and the random intensity ratio (B) of the {557}<9 16 5> orientation satisfy ({(B)/(A)≥5}. When this value is less than 5, it becomes difficult to achieve a high Young's modulus in the transverse direction, which is 225 GPa or more. Further, from this viewpoint, the value expressed by the above-described expression is more desirably 10 or more.

Incidentally, preparation of samples for X-ray diffraction is performed as follows.

First, the steel sheet is polished to a predetermined position in the sheet thickness direction by mechanical polishing, chemical polishing, or the like to be finished into a mirror surface by buffing, and then at the same time as strain removal by electrolytic polishing or chemical polishing, the steel sheet is adjusted so that a ¼ sheet thickness portion may become a measurement surface. Here, it is difficult to precisely position the measurement surface at a predetermined sheet thickness position, so that it is sufficient to prepare the sample so that a region within the range of 3% of the sheet thickness may become the measurement surface with the target position being the center. Further, when measurement by X-ray diffraction is difficult to be performed, by an EBSP (Electron Back Scattering Pattern) method or an ECP (Electron Channeling Pattern) method, a statistically sufficient number of measurements may also be performed.

[Manufacturing Method]

Next, there, will be explained manufacturing conditions of the cold-rolled steel sheet of the present invention in detail.

In the manufacturing method of the cold-rolled steel sheet of the present invention, first a steel billet having the above-described chemical components is heated to 1150° C. or higher. Next, in the temperature range of 1000 to 950° C., rolling with a shape ratio (X) determined by (2) Expression below of 4.4 or less is performed for at least one pass or more with a finish rolling starting temperature set to 1000 to 1100° C. Next, in the temperature range of not lower than a temperature 50° C. lower than an A3 transformation temperature obtained by (3) Expression below (A3 transformation temperature−50° C.) nor higher than 950° C., rolling with the shape ratio (X) determined by (2) Expression below of 3.0 to 4.2 is performed for at least one pass or more. Next, after finish of final rolling, cooling is started within 2 seconds, the temperature within a range down to 700° C. is cooled at an average cooling rate of 15° C./s or more, and then coiling is performed in the temperature range of 500 to 650° C. Next, after pickling is performed, cold rolling at a reduction ratio of 50 to 90% is performed. Then, the temperature in a range of room temperature to 650° C. is heated at an average heating rate of 2 to 20° C./s, and further the temperature from 650° C. to 700° C. is heated at an average heating rate of 2 to 15° C./s. Next, annealing to perform holding for 1 second or longer in the temperature range of not lower than 700° C. nor higher than 900° C. is performed.

$$X \text{ (shape ratio)} = ld/hm \quad (2)$$

(2) Expression above is set as follows.
ld (contact arc length of hot-rolling roll and steel sheet): $\sqrt{L \times (hin-hout)/2}$
hm: (hin+hout)/2
L: roll diameter
hin: rolling roll entry side sheet thickness
hout: rolling roll exit side sheet thickness $$A3(° C.) = 937.2 - 476.5C + 56Si - 19.7Mn - 16.3Cu - 26.6Ni - 4.9Cr + 38.1Mo + 136.3Ti - 19.1Nb + 124.8V + 198.4Al + 3315.0B \quad (3)$$

In (3) Expression above, C, Si, Mn, P, Cu, Ni, Cr, Mo, Ti, Nb, V, Al, and B are the contents of the respective elements [mass %]. With regard to a steel sheet in which Si, Al, Cu, Ni, Cr, Mo, Nb, and V are not intended to be contained, it is calculated with content percentages of these each being 0%. (That is, when Si is less than 0.01%, it is set to 0%. When Al is less than 0.010%, it is set to 0%. When Cu is less than 0.005%, it is set to 0%. When Ni is less than 0.005%, it is set to 0%. When Cr is less than 0.005%, it is set to 0%. When Mo is less than 0.005%, it is set to 0%. When Nb is less than 0.005%, it is set to 0%. When V is less than 0.001%, it is set to 0%.)

In the manufacturing method of the present invention, first, a steel is melted and cast by ordinary methods to obtain a steel billet to be subjected to hot rolling. This steel billet may be the one obtained by forging or rolling a steel ingot, but in terms of productivity, the steel billet is preferably manufactured by continuous casting. Further, it may also be manufactured by using a thin slab caster, or the like.

Further, the steel billet is normally cast to then be cooled and is heated again for performing hot rolling. In this case, a heating temperature of the steel billet when performing hot rolling is set to 1150° C. or higher. This is because when the heating temperature of the steel billet is lower than 1150° C., Nb and Ti are not sufficiently solid-dissolved, and thereby formation of a texture suitable for achievement of high Young's modulus is inhibited during hot rolling. Further, also from the viewpoint of efficient uniform heating of the steel billet, the heating temperature is set to 1150° C. or higher. The upper limit of the heating temperature is not defined, but when it is heated to higher than 1300° C., a crystal grain diameter of the steel sheet becomes coarse to sometimes impair workability. Incidentally, a process such as continuous casting-direct rolling (CC-DR), in which a molten steel is cast to then be hot rolled directly, may also be employed.

In the present invention, the finish rolling starting temperature is important, and its temperature range is set to 1000 to 1100° C. When the finish rolling starting temperature is higher than 1100° C., strain during rolling at a stage prior to finish rolling is not accumulated sufficiently, and during hot rolling, a worked texture does not develop and arains of a hot-rolled sheet do not become fine, so that after cold rolling and annealing, the {332}<110> orientation develops. Further, from this viewpoint, finish rolling is more desirably started at 1050° C. or lower. On the other hand, when rolling is started at lower than 1000° C., it becomes difficult to finish the hot rolling at (the A3 transformation temperature−50)° C. or higher, which is obtained by (3) Expression above, and the orientation to impair the Young's modulus develops, so that 1000° C. is set to the lower limit.

Further, in the manufacturing method of the present invention, in the temperature zone of 1000 to 950° C., rolling with the shape ratio (X) determined by (2) Expression above of 4.4 or less is performed for at least one pass or more. By the rolling in this temperature range, a hot-rolled austenite structure is recrystallized to thereby make a grain diameter of the hot-rolled sheet fine, and an effect of suppressing development of the {332}<110> orientation after cold rolling and annealing is obtained. However, when the shape ratio exceeds 4.4, at the time of cold rolling and recrystallization annealing, the {557}<9 16 5> orientation is not easily formed in the vicinity of the surface, so that the upper limit of the shape ratio is limited to 4.4. The preferable range is 4.2 or less.

Subsequently to the above-described rolling, in the temperature zone of not lower than (the A3 transformation temperature−50)° C. nor higher than 950° C., rolling with the shape ratio (X) determined by (2) Expression above of 3.0 to 4.2 is performed for at least one pass or more.

The A3 transformation temperature is obtained by (3) Expression above. When the rolling is performed at lower than (the A3 transformation temperature−50)° C., the rolling results in α-region hot rolling and the {100}<001> orientation to decrease the Young's modulus develops, and the grain diameter of the hot-rolled sheet is decreased and the {332}<110> orientation becomes weak. Therefore, this temperature is set to the lower limit. On the other hand, unless moderate shear deformation is applied in the temperature zone of 950° C. or lower where recrystallization is suppressed, an initial structure to be a nucleation site of the {557}<9 16 5> orientation is not formed at the time of cold rolling and recrystallization annealing, so that this temperature is set to the upper limit. Further, from this viewpoint, the above-described rolling temperature is preferably set to 930° C. or lower.

When in the rolling to be performed in the temperature zone of not lower than (the A3 transformation temperature−50)° C. nor higher than 950° C., the shape ratio determined by (2) Expression above is less than 3.0, sufficient shear deformation is not applied, so that this value is set to the lower limit. On the other hand, when the rolling is performed with the shape ratio of 4.2 or more, in the uppermost layer of the hot-rolled sheet, the orientation to increase anisotropy of the r value develops after cold rolling and annealing, so that this value is set to the upper limit. Incidentally, the rolling roll diameter L is measured at room temperature, and flattening during hot rolling does not have to be considered. Further, of each rolling roll, the entry side sheet thickness hin and the exit side sheet thickness hout may be measured on site by using radiations or the like, or may also be obtained by calculation in consideration of deformation resistance and the like by a rolling load.

Next, after final finish rolling is finished, cooling is started within 2 seconds and cooling is performed down to 700° C. at an average cooling rate of 15° C./s or more. The time period until start of cooling is desirably 1.5 seconds or shorter. When the time period until start of cooling after finish of final finish rolling exceeds 2 seconds, the grain diameter of the hot-rolled sheet becomes coarse, and at the time of cold rolling and recrystallization annealing, the {332}<110> orientation is intensified. Further, when an attainment temperature of cooling is higher than 700° C. and a cooling rate becomes less than 15° C./s, hardenability becomes insufficient, the grain diameter of the hot-rolled sheet increases, the structure is turned into polygonal ferrite, and the {332}<110> orientation is intensified. Therefore, in the present invention, 15° C./s is set to the lower limit of the average cooling rate. Incidentally, the upper limit of the average cooling rate is not defined, but cooling at 100° C./s or more requires an excessive facility to be provided, and no special effect can also be obtained, so that cooling is desirably performed at a rate of less than 100° C./s.

After the cooling performed on the above-described condition, coiling is performed in the temperature range of 500 to 650° C. When a coiling temperature becomes lower than 500° C., TiC or NbC does not precipitate, solid-solution C remains, and the r value decreases, so that this value is set to the lower limit of the coiling temperature. On the other hand, when the coiling temperature becomes higher than 650° C., the grain diameter of the hot-rolled sheet increases, the structure is turned into polygonal ferrite having linear grain boundaries, and the {332}<110> orientation increases. Thus, in the present invention, 650° C. is set to the upper limit of the coiling temperature. Further, from this viewpoint, the coiling temperature is more desirably set to 600° C. or lower.

Next, the hot-rolled steel sheet manufactured by the above-described method is pickled, to then be subjected to cold rolling at a reduction ratio in the range of 50 to 90%. When the reduction ratio in the cold rolling is set to less than 50%, a sufficient cold-rolled texture does not develop and the r value decreases, so that this value is set to the lower limit. Further, from this viewpoint, the reduction ratio in the cold rolling is more desirably 60% or more, and is still more desirably 65% or more. On the other hand, when the reduction ratio becomes greater than 90%, a load on a cold rolling mill increases, and integration degree of the {110}<001> orientation being an orientation to increase the anisotropy of the r value and integration degree of the {110}<012> orientation to decrease the absolute values of the r value and the Young's modulus increase, so that this value is set to the upper limit. Further, from this viewpoint, the reduction ratio in the cold rolling is more desirably set to 85% or less, and is still more desirably 80% or less.

Next, annealing is performed. On this occasion, an average heating rate from room temperature to 650° C. is set to 2 to 20° C./s. When this heating rate is less than 2° C./s, recrystallization occurs at low temperature and the {557}<9 16 5> orientation becomes weak, so that this value is set to the lower limit. Further, from this viewpoint, the heating rate is more desirably set to 4° C./s or more. On the other hand, when the heating rate exceeds 20° C./s, recrystallization does not start during heating and the {112}<110> orientation develops, so that a decrease in the r value in the 45° direction is caused. Further, from this viewpoint, the heating rate is more desirably set to 15° C./s or less.

Next, heating is performed in the range of 650° C. to 700° C., and an average heating rate in this temperature range is set to 2 to 15° C./s. When this heating rate is less than 2° C./s, the {557}<9 16 5> orientation becomes weak, so that this value is set to the lower limit. Further, from this viewpoint, the heating rate is more desirably set to 4° C./s or more. On the other hand, when the heating rate exceeds 15° C./s, recrystallization does not start during heating and the {112}<110> orientation develops, so that a decrease in the r value in the 45° direction is caused and further the {332}<110> orientation is intensified. From this viewpoint, the heating rate is more desirably set to 10° C./s or less.

After heating is performed up to 700° C. at the above-described heating rate, heating is further performed to not lower than 700° C. nor higher than 900° C. for 1 second or longer. When an annealing temperature is 700° C. or lower, a worked structure formed at the time of cold rolling remains as it is, and thus formability decreases significantly, so that this temperature is set to the lower limit value of annealing. On the other hand, when the annealing temperature becomes higher than 900° C., a texture is broken and shape fixability deteriorates, so that this is set to the upper limit.

Incidentally, in the manufacturing method of the cold-rolled steel sheet of the present invention, after the annealing performed on the above-described condition, temper rolling at a reduction ratio of 10% or less may also be performed in-line or off-line.

[Electrogalvanized Cold-Rolled Steel Sheet, Hot-Dip Galvanized Cold-Rolled Steel Sheet, and Alloyed Hot-Dip Galvanized Cold-Rolled Steel Sheet]

The electrogalvanized cold-rolled steel sheet of the present invention is one in which on the surface of the cold-rolled steel sheet of the above-described present invention, electrogalvanizing is further performed. Further, the hot-dip galvanized cold-rolled steel sheet of the present invention is one in which on the surface of the cold-rolled steel sheet of the above-described present invention, hot-dip galvanizing is further performed. Further, the alloyed hot-dip galvanized cold-rolled steel sheet of the present invention is one in which on the surface of the cold-rolled steel sheet of the above-described present invention, alloying hot-dip galvanizing is further performed. As above, in the present invention, on the surface of the cold-rolled steel sheet, electrogalvanizing, hot-dip galvanizing, or alloying hot-dip galvanizing may also be performed as usage.

With regard to a manufacturing method of the electrogalvanized cold-rolled steel sheet of the present invention, on the surface of the cold-rolled steel sheet manufactured on the above-described conditions and by the above-described steps, electrogalvanizing is performed by a conventional well-known method. Further, with regard to a manufacturing method of the hot-dip galvanized cold-rolled steel sheet (alloyed hot-dip galvanized cold-rolled steel sheet) of the present invention, on the surface of the cold-rolled steel sheet manufactured on the above-described conditions and by the above-described steps, hot-dip galvanizing is performed by a conventional well-known method.

On this occasion, the composition of the galvanizing is not limited in particular, and in addition to zinc, Fe, Al, Mn, Cr, Mg, Pb, Sn, Ni, and the like may also be contained according to need.

By the above-described methods, the electrogalvanized cold-rolled steel sheet and the hot-dip galvanized cold-rolled steel sheet of the present invention can be obtained.

Then, in the case of manufacturing the alloyed hot-dip galvanized cold-rolled steel sheet of the present invention, on the hot-dip galvanized cold-rolled steel sheet of the present invention obtained by the above-described method, a heat treatment is performed for 10 seconds or longer in a temperature range of 450 to 600° C., which is set to a method of performing an alloying treatment.

The above-described alloying treatment (heat treatment) needs to be performed in the range of 450 to 600° C. When this temperature is lower than 450° C., there is caused a problem that alloying does not progress sufficiently. Further, when it is 600° C. or higher, alloying progresses excessively and a plating layer becomes brittle, so that a problem such as peeling of plating caused by working such as pressing is caused.

Further, the time period for the alloying treatment is set to 10 seconds or longer. When the time period for the alloying treatment is shorter than 10 seconds, alloying does not progress sufficiently. Incidentally, the upper limit of the time period of the alloying treatment is not defined in particular, but the alloying treatment is normally performed by heat treatment equipment installed in a continuous line, so that when it is performed for longer than 3000 seconds, productivity is impaired, or a facility investment is required and the manufacturing cost is increased, and thus this is preferably set to the upper limit.

Incidentally, in the present invention, prior to the above-described alloying treatment, annealing at an Ac3 transformation temperature or lower may also be performed beforehand according to the structure of a manufacturing facility. As long as the temperature of the annealing to be performed before the alloying treatment is a temperature in the above-described temperature zone or lower, the texture hardly changes, so that it is possible to suppress a decrease in Young's modulus.

Further, in the present invention, the above-described temper rolling may also be performed after the electroaalvanizina, the aalvanizina, and the alloying treatment.

According to the cold-rolled steel sheet excellent in rigidity and deep drawability, the electrogalvanized cold-rolled steel sheet, the hot-dip galvanized cold-rolled steel sheet, the alloyed hot-dip galvanized cold-rolled steel sheet, and the manufacturing methods of the same of the present invention that are explained above, the above-described constitution makes it possible to obtain a cold-rolled steel sheet whose rigidity is excellent because the Young's modulus in both the directions are 206 GPa or more, the Young's modulus in the rolling perpendicular direction is 225 GPa or more, and the static Young's modulus in the rolling direction improves and whose deep drawability is excellent because the average r value is 1.4 or more, an electrogalvanized cold-rolled steel sheet, a hot-dip galvanized cold-rolled steel sheet, or an alloyed hot-dip galvanized cold-rolled steel sheet.

Thus, application of the present invention to an automobile member such as a panel member, for example, makes it possible to sufficiently enjoy merits of fuel efficiency improvement and reduction in vehicle body weight associated with sheet thinning of a member achieved by improvement in rigidity in addition to improvement in workability, so that social contributions are immeasurable.

EXAMPLE

Hereinafter, the present invention will be explained more concretely by citing examples of the cold-rolled steel sheet, the electrogalvanized cold-rolled steel sheet, the hot-dip galvanized cold-rolled steel sheet, the alloyed hot-dip galvanized cold-rolled steel sheet, and the manufacturing methods of the same of the present invention. The present invention is not limited to the following examples, and can also be carried out with appropriate modification being added within a range conforming to the spirit described above and the spirit to be described later, and they are all included in the technical scope of the present invention.

In this example, steels having compositions shown in Table 1 were first melted to manufacture steel billets. Each of the steel billets in Table 1 was heated to be subjected to rough rolling in hot working, and then was subjected to finish rolling under conditions shown in Table 2 subsequently. A finish rolling stand is made of seven stages in total, and a roll diameter is 650 to 830 mm. Further, a finished sheet thickness after the final pass is set to 2.3 mm to 4.5 mm.

In Table 1, each underline attached to a numerical value means that an alloy component is outside the range of the present invention. "–" means that each alloy component is not contained intentionally. Further, "(1) EXPRESSION Mn/B" shown in Table 1 is a value of "(Mn (mass %)–Mn* (mass %))/(B (ppm)–B*(ppm))" in (1) Expression above. "(3) EXPRESSION (A3–50)° C." is a value of the temperature 50° C. lower than the A3 transformation temperature obtained by (3) Expression above (the A3 transformation temperature–50° C.).

In Table 2, each underline attached to a numerical value means that a manufacturing condition is outside the range of the present invention. SRT [° C.] represents a heating temperature of the steel billet, F0T [° C.] represents an entry side temperature of the first pass of finish rolling (a finish rolling starting temperature), FT [° C.] represents a temperature after the final pass of finish rolling, namely an exit side temperature of finish rolling, t [s] represents a time period until start of cooling after final finish rolling, a cooling rate indicates an average cooling rate down to 700° C. after finish of finish rolling, and CT [° C.] represents a coiling temperature. A shape ratio 1 indicates a shape ratio of the fourth pass of finish rolling performed in the temperature zone of 1000° C. to 950° C., and a shape ratio 2 indicates a shape ratio of the seventh pass of finish rolling performed in the temperature zone of not lower than (the A3 transformation temperature−50)° C. nor higher than 950° C. A cold rolling ratio is a value of a difference between a sheet thickness of a hot-rolled sheet and a sheet thickness after finish of cold rolling divided by the sheet thickness of the hot-rolled sheet to be shown in percentage. A heating rate 1 indicates an average heating rate from room temperature to 650° C. A heating rate 2 indicates an average heating rate from 650° C. to 700° C.

TABLE 1

| STEEL No. | STEEL COMPONENT (MASS %) | | | | | | | | | | | |
|---|---|---|---|---|---|---|---|---|---|---|---|---|
| | C | Si | Mn | P | S | Al | N | Ti | B | Nb | Mo | Cr |
| A | 0.0045 | 0.01 | 1.50 | 0.01 | 0.008 | 0.040 | 0.0023 | 0.030 | 0.0014 | 0.03 | — | — |
| B | 0.0022 | 0.38 | 1.70 | 0.09 | 0.004 | 0.035 | 0.0022 | 0.010 | 0.0009 | 0.021 | — | — |
| C | 0.0036 | 0.46 | 1.35 | 0.07 | 0.002 | 0.035 | 0.0020 | 0.023 | 0.0017 | 0.015 | — | — |
| D | 0.0044 | 0.30 | 1.62 | 0.05 | 0.003 | 0.030 | 0.0035 | 0.021 | 0.0012 | 0.023 | — | — |
| E | 0.0042 | 0.18 | 1.39 | 0.08 | 0.002 | 0.032 | 0.0018 | 0.015 | 0.0009 | 0.001 | — | — |
| F | 0.0023 | 0.72 | 1.78 | 0.03 | 0.006 | 0.042 | 0.0022 | 0.018 | 0.0011 | 0.013 | — | — |
| G | 0.0018 | 0.13 | 1.24 | 0.10 | 0.004 | 0.025 | 0.0025 | 0.022 | 0.0013 | 0.021 | — | — |
| H | 0.0017 | 0.45 | 1.79 | 0.01 | 0.005 | 0.042 | 0.0030 | 0.030 | 0.0009 | 0.009 | — | — |
| I | 0.0029 | 0.55 | 1.20 | 0.06 | 0.006 | 0.027 | 0.0018 | 0.019 | 0.0009 | — | — | — |
| J | 0.0032 | 0.33 | 1.46 | 0.06 | 0.003 | 0.033 | 0.0042 | 0.025 | 0.0015 | 0.017 | — | — |
| K | 0.0016 | 0.25 | 1.35 | 0.07 | 0.002 | 0.035 | 0.0025 | 0.009 | 0.0008 | — | — | — |
| L | 0.0046 | 0.02 | 1.92 | 0.05 | 0.001 | 0.036 | 0.0020 | 0.018 | 0.0013 | 0.018 | — | 0.05 |
| M | 0.0033 | 0.47 | 1.32 | 0.06 | 0.007 | 0.033 | 0.0023 | 0.023 | 0.0016 | 0.011 | — | — |
| N | 0.0021 | 0.09 | 1.19 | 0.03 | 0.003 | 0.029 | 0.0026 | 0.028 | 0.0011 | 0.013 | 0.050 | — |
| O | 0.0019 | 0.32 | 1.38 | 0.09 | 0.004 | 0.026 | 0.0030 | 0.033 | 0.0012 | 0.035 | — | — |
| P | 0.0024 | 0.15 | 0.82 | 0.06 | <u>0.012</u> | 0.035 | 0.0029 | 0.021 | 0.0023 | 0.020 | — | 0.10 |
| Q | 0.0038 | 0.43 | 1.27 | 0.12 | 0.005 | 0.030 | 0.0036 | — | 0.0013 | — | — | — |
| R | <u>0.0120</u> | 0.32 | 1.53 | 0.08 | 0.006 | 0.025 | 0.0028 | 0.023 | 0.0014 | — | — | — |
| S | 0.0026 | 0.30 | <u>0.15</u> | 0.08 | 0.004 | 0.033 | 0.0035 | 0.025 | 0.0019 | 0.015 | — | — |
| T | 0.0042 | 0.12 | <u>2.70</u> | 0.07 | 0.003 | 0.043 | 0.0022 | 0.019 | 0.0021 | — | — | — |
| U | 0.0035 | 0.35 | 1.13 | 0.06 | 0.003 | 0.032 | 0.0030 | 0.022 | 0.0001 | 0.019 | — | — |
| V | 0.0027 | 0.25 | 1.43 | 0.05 | 0.003 | 0.033 | 0.0029 | <u>0.180</u> | 0.0015 | 0.013 | — | — |
| W | 0.0028 | 0.33 | 1.58 | 0.06 | 0.003 | 0.041 | 0.0023 | 0.031 | <u>0.0130</u> | 0.018 | — | 0.05 |

| STEEL No. | STEEL COMPONENT (MASS %) | | | | | | (1) EXPRESSION | (3) EXPRESSION | NOTE |
|---|---|---|---|---|---|---|---|---|---|
| | W | Cu | Ni | Ca | Rem | V | Mn/B | (A$_3$ − 50)° C. | |
| A | — | — | — | — | — | — | 0.11 | 872.2 | PRESENT INVENTION STEEL |
| B | — | — | — | — | — | — | 0.19 | 884.8 | PRESENT INVENTION STEEL |
| C | — | — | — | — | — | — | 0.08 | 900.1 | PRESENT INVENTION STEEL |
| D | — | 0.05 | 0.02 | — | — | — | 0.13 | 881.0 | PRESENT INVENTION STEEL |
| E | — | — | — | — | — | — | 0.15 | 879.3 | PRESENT INVENTION STEEL |
| F | — | — | — | — | — | — | 0.16 | 905.5 | PRESENT INVENTION STEEL |
| G | — | — | — | — | — | — | 0.09 | 881.1 | PRESENT INVENTION STEEL |
| H | — | — | — | — | — | — | 0.20 | 891.6 | PRESENT INVENTION STEEL |
| I | — | — | — | — | — | 0.020 | 0.13 | 906.4 | PRESENT INVENTION STEEL |
| J | — | — | — | — | — | — | 0.10 | 890.0 | PRESENT INVENTION STEEL |
| K | — | — | — | 0.0007 | — | — | 0.17 | 884.7 | PRESENT INVENTION STEEL |
| L | 0.05 | — | — | — | — | — | 0.15 | 861.6 | PRESENT INVENTION STEEL |
| M | — | — | — | — | 0.001 | — | 0.08 | 900.7 | PRESENT INVENTION STEEL |
| N | — | — | — | — | — | — | 0.11 | 882.7 | PRESENT INVENTION STEEL |
| O | — | — | — | — | — | — | 0.11 | 890.0 | PRESENT INVENTION STEEL |
| P | — | — | — | — | — | — | <u>0.03</u> | 894.9 | COMPARATIVE STEEL |
| Q | — | — | — | — | — | — | <u>−0.10</u> | 894.7 | COMPARATIVE STEEL |
| R | — | — | — | — | — | — | 0.11 | 882.0 | COMPARATIVE STEEL |
| S | — | — | — | — | — | — | <u>0.01</u> | 915.8 | COMPARATIVE STEEL |
| T | — | — | — | — | — | — | 0.13 | 856.8 | COMPARATIVE STEEL |
| U | — | — | — | — | — | — | <u>1.12</u> | 892.2 | COMPARATIVE STEEL |
| V | — | — | — | 0.0003 | — | — | 0.09 | 907.5 | COMPARATIVE STEEL |
| W | — | — | — | — | — | — | <u>0.01</u> | 928.1 | COMPARATIVE STEEL |

(NOTICE) EACH UNDERLINE INDICATES CONDITION OUTSIDE THE RANGE OF THE PRESENT INVENTION.

(Mn(mass %) − Mn*(mass %))/(B(ppm) − B*(ppm)) $\cdots$ (1)

BUT, IN (1) EXPRESSION,

B*(ppm) = 10(N(mass %) − 14Ti(mass %)/48)/14 × 1000

Mn*(mass %) = 55S(mass %)/32

HERE, IN THE CASE OF Mn* < 0 AND B* < 0, IT IS SET TO 0.

A$_3$ − 50(° C.) = (937.2 − 476.5C + 56Si − 19.7Mn − 16.3Cu − 26.6Ni − 4.9Cr + 38.1Mo + 136.3Ti − 19.1Nb + 124.8V + 198.4Al + 3315.0B) − 50 $\cdots$ (2)

TABLE 2

| MANU-FACTURE No. | STEEL No. | A₃ − 50 °C. | SRT °C. | SHAPE RATIO 1 | SHAPE RATIO 2 | F₀T °C. | FT °C. | t s | COOLING RATE °C./s |
|---|---|---|---|---|---|---|---|---|---|
| 1 | A | 872.2 | 1230 | 3.91 | 3.07 | 1082 | 920.3 | 1.4 | 23 |
| 2 | | | 1250 | 3.89 | 3.18 | 1089 | 910.7 | 1.2 | 25 |
| 3 | | | 1250 | 3.02 | 3.18 | 1082 | 916 | 1.4 | 23 |
| 4 | | | 1250 | 4.48 | 3.18 | 1083 | 915 | 1.4 | 23 |
| 5 | B | 884.8 | 1250 | 4.18 | 3.30 | 1086 | 886 | 0.8 | 18 |
| 6 | | | 1250 | 4.18 | 3.35 | 1087 | 890 | 0.8 | 40 |
| 7 | | | 1250 | 4.18 | 3.35 | 1085 | 899 | 2.5 | 18 |
| 8 | | | 1250 | 4.18 | 3.35 | 1083 | 895 | 0.8 | 18 |
| 9 | C | 900.1 | 1250 | 3.98 | 3.54 | 1086 | 903 | 1.0 | 30 |
| 10 | | | 1160 | 3.98 | 3.61 | 1013 | 908 | 1.0 | 20 |
| 11 | | | 1170 | 3.98 | 2.51 | 1009 | 914 | 1.0 | 20 |
| 12 | D | 881.0 | 1200 | 3.68 | 3.84 | 1038 | 896 | 1.0 | 25 |
| 13 | | | 1200 | 3.68 | 3.88 | 1044 | 893 | 1.0 | 18 |
| 14 | | | 1200 | 4.52 | 3.85 | 1040 | 893 | 1.0 | 18 |
| 15 | E | 879.3 | 1250 | 4.01 | 4.00 | 1092 | 890 | 0.5 | 30 |
| 16 | | | 1200 | 4.01 | 4.10 | 1036 | 892 | 0.5 | 35 |
| 17 | | | 1000 | 4.01 | 4.08 | 955 | 840 | 0.5 | 25 |
| 18 | | | 1250 | 4.01 | 4.01 | 1090 | 890 | 0.5 | 30 |
| 19 | F | 905.5 | 1150 | 4.01 | 3.11 | 1023 | 916 | 0.4 | 30 |
| 20 | | | 1200 | 4.01 | 3.23 | 1045 | 919 | 0.4 | 50 |
| 21 | | | 1200 | 4.01 | 3.27 | 1038 | 908 | 0.4 | 24 |
| 22 | G | 881.1 | 1250 | 3.99 | 3.35 | 1088 | 891 | 0.4 | 45 |
| 23 | | | 1150 | 3.99 | 3.52 | 1008 | 892 | 0.4 | 30 |
| 24 | | | 1250 | 3.99 | 3.55 | 1138 | 978 | 0.4 | 24 |
| 25 | H | 891.6 | 1200 | 3.98 | 3.67 | 1040 | 901 | 1.2 | 23 |
| 26 | | | 1250 | 3.98 | 3.81 | 1094 | 898 | 1.2 | 8 |
| 27 | | | 1200 | 3.98 | 3.68 | 1041 | 901 | 2.4 | 23 |
| 28 | I | 906.4 | 1170 | 3.85 | 3.91 | 1009 | 892 | 1.2 | 45 |
| 29 | | | 1200 | 3.85 | 4.04 | 1043 | 910 | 1.2 | 23 |
| 30 | | | 1150 | 3.85 | 4.09 | 1034 | 924 | 1.2 | 60 |
| 31 | J | 890.0 | 1200 | 4.11 | 4.17 | 1039 | 898 | 1.2 | 40 |
| 32 | | | 1230 | 4.11 | 3.11 | 1072 | 895 | 1.2 | 36 |
| 33 | K | 884.7 | 1230 | 4.16 | 3.19 | 1069 | 889 | 0.9 | 25 |
| 34 | | | 1180 | 4.16 | 3.31 | 1019 | 896 | 0.9 | 26 |
| 35 | L | 861.6 | 1200 | 4.11 | 3.44 | 1038 | 872 | 1.0 | 35 |
| 36 | | | 1150 | 4.11 | 3.52 | 1027 | 868 | 1.0 | 40 |
| 37 | M | 900.7 | 1200 | 3.90 | 3.61 | 1043 | 910 | 0.4 | 22 |
| 38 | | | 1160 | 3.90 | 3.74 | 1004 | 910 | 0.4 | 19 |
| 39 | N | 882.7 | 1150 | 4.08 | 3.80 | 1023 | 910 | 1.1 | 23 |
| 40 | | | 1200 | 4.08 | 3.86 | 1036 | 891 | 1.1 | 26 |
| 41 | | | 1170 | 4.08 | 4.00 | 1009 | 898 | 1.1 | 32 |
| 42 | O | 890.0 | 1150 | 4.05 | 4.14 | 1012 | 898 | 1.0 | 19 |
| 43 | | | 1200 | 4.05 | 4.17 | 1044 | 908 | 1.0 | 34 |
| 44 | | | 1230 | 4.05 | 4.98 | 1066 | 891 | 1.0 | 29 |
| 45 | P | 894.9 | 1250 | 4.05 | 3.25 | 1093 | 905 | 0.5 | 22 |
| 46 | Q | 894.7 | 1170 | 4.05 | 3.30 | 1010 | 895 | 0.5 | 43 |
| 47 | R | 882.0 | 1150 | 4.05 | 3.36 | 1008 | 897 | 0.5 | 16 |
| 48 | S | 915.8 | 1250 | 4.05 | 3.51 | 1086 | 917 | 0.5 | 20 |
| 49 | T | 856.8 | 1230 | 4.05 | 3.60 | 1070 | 889 | 0.5 | 32 |
| 50 | U | 892.2 | 1175 | 4.05 | 3.69 | 1020 | 898 | 0.5 | 29 |
| 51 | V | 907.5 | 1230 | 4.05 | 3.69 | 1035 | 910 | 0.5 | 23 |
| 52 | W | 928.1 | 1200 | 4.05 | 3.59 | 1028 | 935 | 0.5 | 24 |

| MANU-FACTURE No. | CT °C. | COLD ROLLING RATIO % | HEATING RATE 1 °C.s/ | HEATING RATE 2 °C./s | ANNEALING TEMPERATURE °C. | PLATING | NOTE |
|---|---|---|---|---|---|---|---|
| 1 | 550 | 80 | 3 | 5 | 790 | | PRESENT INVENTION EXAMPLE |
| 2 | 640 | 70 | 12 | 5 | 820 | | PRESENT INVENTION EXAMPLE |
| 3 | 550 | 80 | 12 | 5 | 790 | | COMPARATIVE EXAMPLE |
| 4 | 550 | 80 | 18 | 5 | 790 | | COMPARATIVE EXAMPLE |
| 5 | 500 | 80 | 6 | 6 | 810 | | PRESENT INVENTION EXAMPLE |
| 6 | 620 | 82 | 6 | 6 | 800 | | PRESENT INVENTION EXAMPLE |
| 7 | 500 | 80 | 6 | 6 | 800 | | COMPARATIVE EXAMPLE |
| 8 | 500 | 80 | 6 | 1 | 800 | | COMPARATIVE EXAMPLE |
| 9 | 620 | 80 | 3 | 6 | 850 | ELECTRO | PRESENT INVENTION EXAMPLE |
| 10 | 550 | 78 | 3 | 5 | 810 | | PRESENT INVENTION EXAMPLE |
| 11 | 500 | 78 | 9 | 5 | 870 | | COMPARATIVE EXAMPLE |
| 12 | 550 | 80 | 4 | 8 | 800 | | PRESENT INVENTION EXAMPLE |
| 13 | 600 | 69 | 5 | 8 | 840 | | PRESENT INVENTION EXAMPLE |
| 14 | 600 | 69 | 5 | 8 | 840 | | COMPARATIVE EXAMPLE |

TABLE 2-continued

| | | | | | | | |
|---|---|---|---|---|---|---|---|
| 15 | 500 | 75 | 8 | 8 | 850 | HOT DIP | PRESENT INVENTION EXAMPLE |
| 16 | 500 | 80 | 5 | 10 | 820 | | PRESENT INVENTION EXAMPLE |
| 17 | 550 | 82 | 3 | 11 | 760 | | COMPARATIVE EXAMPLE |
| 18 | 500 | 75 | 8 | <u>25</u> | 850 | | COMPARATIVE EXAMPLE |
| 19 | 550 | 78 | 5 | 5 | 860 | | PRESENT INVENTION EXAMPLE |
| 20 | 600 | 67 | 12 | 10 | 830 | ELECTRO | PRESENT INVENTION EXAMPLE |
| 21 | 620 | 78 | 3 | 5 | <u>910</u> | | COMPARATIVE EXAMPLE |
| 22 | 500 | 83 | 4 | 4 | 770 | ALLOY | PRESENT INVENTION EXAMPLE |
| 23 | 580 | 77 | 5 | 6 | 780 | | PRESENT INVENTION EXAMPLE |
| 24 | 500 | 79 | 9 | 8 | 840 | | COMPARATIVE EXAMPLE |
| 25 | 550 | 85 | 4 | 5 | 850 | | PRESENT INVENTION EXAMPLE |
| 26 | 500 | <u>40</u> | 7 | 8 | 790 | | COMPARATIVE EXAMPLE |
| 27 | 550 | <u>85</u> | 4 | 5 | 840 | | COMPARATIVE EXAMPLE |
| 28 | 650 | 76 | 3 | 5 | 780 | ELECTRO | PRESENT INVENTION EXAMPLE |
| 29 | 500 | 77 | 4 | 6 | 850 | | PRESENT INVENTION EXAMPLE |
| 30 | <u>400</u> | 80 | 10 | 10 | 870 | | COMPARATIVE EXAMPLE |
| 31 | 550 | 89 | 7 | 8 | 840 | | PRESENT INVENTION EXAMPLE |
| 32 | 600 | 82 | 7 | 8 | 810 | | PRESENT INVENTION EXAMPLE |
| 33 | 550 | 76 | 2 | 4 | 790 | HOT DIP | PRESENT INVENTION EXAMPLE |
| 34 | <u>680</u> | <u>94</u> | 3 | 4 | 780 | | COMPARATIVE EXAMPLE |
| 35 | 500 | 82 | 2 | 5 | 770 | | PRESENT INVENTION EXAMPLE |
| 36 | 550 | 77 | 6 | 5 | 860 | | PRESENT INVENTION EXAMPLE |
| 37 | 500 | 71 | 8 | 8 | 830 | | PRESENT INVENTION EXAMPLE |
| 38 | 550 | 75 | <u>46</u> | 8 | 860 | | COMPARATIVE EXAMPLE |
| 39 | 600 | 73 | 8 | 8 | 780 | ALLOY | PRESENT INVENTION EXAMPLE |
| 40 | 530 | 82 | 10 | 10 | 800 | | PRESENT INVENTION EXAMPLE |
| 41 | 600 | 80 | 4 | 4 | <u>670</u> | | COMPARATIVE EXAMPLE |
| 42 | 650 | 79 | 3 | 3 | 830 | | PRESENT INVENTION EXAMPLE |
| 43 | 500 | 67 | 2 | 2 | 820 | | PRESENT INVENTION EXAMPLE |
| 44 | 500 | 73 | 4 | 4 | 850 | | COMPARATIVE EXAMPLE |
| 45 | 520 | 80 | 5 | 5 | 860 | ALLOY | COMPARATIVE EXAMPLE |
| 46 | 580 | 80 | 4 | 5 | 790 | | COMPARATIVE EXAMPLE |
| 47 | 560 | 79 | 14 | 10 | 800 | | COMPARATIVE EXAMPLE |
| 48 | 550 | 72 | 3 | 3 | 810 | | COMPARATIVE EXAMPLE |
| 49 | 640 | 78 | 15 | 14 | 770 | | COMPARATIVE EXAMPLE |
| 50 | 550 | 75 | 4 | 4 | 830 | | COMPARATIVE EXAMPLE |
| 51 | 580 | 80 | 8 | 8 | 720 | | COMPARATIVE EXAMPLE |
| 52 | 600 | 75 | 17 | 15 | 750 | | COMPARATIVE EXAMPLE |

(NOTICE) EACH UNDERLINE INDICATES CONDITION OUTSIDE THE RANGE OF THE PRESENT INVENTION.

From each of obtained cold-rolled steel sheets, a tensile test piece based on JIS Z 2201 was taken with the rolling perpendicular direction being a longitudinal direction, a tensile test was performed based on JIS Z 2241, and a tensile strength was measured.

With regard to the r value, in the same manner as that in the tensile test, tensile test pieces based on JIS Z 2201 were taken with the rolling direction, the 45° direction, and the rolling perpendicular direction each being a longitudinal direction, and values were measured with 15% of a strain amount.

With regard to measurement of the Young's modulus, it was measured by both the above-described static tensile method and an oscillation method.

The measurement of the Young's modulus by the static tensile method was performed by using a tensile test piece based on JIS Z 2201 and applying a tensile stress equivalent to ½ of a yield strength of the steel sheet. On this occasion, the measurement was performed five times, and among Young's modulus calculated based on a slope of a stress-strain diagram, an average value of three measurement values excluding the maximum value and the minimum value was found as the Young's modulus by the static tensile method, and this was shown in Table 3 as a tensile Young's modulus. Incidentally, with regard to an electrogalvanized steel sheet, a hot-dip galvanized steel sheet, and an alloyed hot-dip galvanized steel sheet to be described later, the measurement was performed after a plating layer on the surface was peeled off.

The random intensity ratios of the {332}<110>, {557}<916 7>, and {111}<112> orientations at the position of ¼ sheet thickness of the steel sheet were measured as follows. First, a sample obtained in a manner that the steel sheet was mechanically polished and buffed, and then was further electrolytic polished to remove strain and was adjusted so that a ¼ sheet thickness portion became a measurement surface was used to be subjected to X-ray diffraction. Incidentally, X-ray diffraction of a standard sample without having accumulation to a specific orientation was also performed on the same condition.

Next, based on the {110}, {100}, {211}, and {310} pole figures obtained by the X-ray diffraction, an ODF was obtained by a series expansion method. Then, from this ODF, the random intensity ratios of the above-described orientations were determined.

Further, among these steel sheets, the case where electrogalvanizing was performed after cold rolling and annealing was shown as "ELECTRO" in Table 2, the case where hot-dip galvanizing was performed was shown as "HOT DIP" in Table 2, and further the case where after the hot-dip galvanizing, an alloying treatment to perform holding for 15 seconds at 520° C. was performed and alloying hot-dip galvanizing was performed was shown as "ALLOY."

Incidentally, as an electrogalvanizing treatment in this example, Zn—Ni plating (Ni=11 mass %) was performed.

Each weight was set to 20 g/m2.

Results in this example are shown in Table 3. Incidentally, in the column of Young's modulus in Table 3, RD means the rolling direction (Rolling Direction), 45° means 45° with respect to the rolling direction, and TD means the transverse direction (Transverse Direction) respectively.

TABLE 3

| MANU-FACTURE No. | STEEL No. | YS MPa | TS MPa | El % | RANDOM INTENSITY A[1] | RANDOM INTENSITY B[2] | RANDOM INTENSITY C[3] | B/A | YOUNG'S MODULUS (RD) GPa | YOUNG'S MODULUS (45°) GPa | YOUNG'S MODULUS (TD) GPa | AVERAGE r VALUE | NOTE |
|---|---|---|---|---|---|---|---|---|---|---|---|---|---|
| 1 | A | 302 | 455 | 32 | 0.4 | 9.8 | 8.4 | 24.5 | 214 | 208 | 229 | 1.63 | PRESENT INVENTION EXAMPLE |
| 2 |   | 308 | 459 | 32 | 0.3 | 9.0 | 7.4 | 30.0 | 214 | 207 | 227 | 1.55 | PRESENT INVENTION EXAMPLE |
| 3 |   | 305 | 450 | 32 | 4.0 | 8.1 | 8.0 | 2.0 | 205 | 208 | 220 | 1.37 | COMPARATIVE EXAMPLE |
| 4 |   | 306 | 460 | 32 | 2.4 | 6.7 | 8.9 | 2.8 | 213 | 207 | 220 | 1.38 | COMPARATIVE EXAMPLE |
| 5 | B | 320 | 474 | 35 | 0.8 | 11.7 | 9.9 | 14.6 | 216 | 211 | 232 | 1.71 | PRESENT INVENTION EXAMPLE |
| 6 |   | 322 | 476 | 35 | 0.5 | 11.2 | 9.5 | 22.4 | 216 | 209 | 234 | 1.63 | PRESENT INVENTION EXAMPLE |
| 7 |   | 320 | 472 | 34 | 3.4 | 9.4 | 8.7 | 2.8 | 205 | 210 | 222 | 1.66 | COMPARATIVE EXAMPLE |
| 8 |   | 340 | 477 | 34 | 0.8 | 6.8 | 8.9 | 8.5 | 205 | 207 | 223 | 1.36 | COMPARATIVE EXAMPLE |
| 9 | C | 305 | 459 | 36 | 0.7 | 9.0 | 7.3 | 12.9 | 214 | 207 | 227 | 1.53 | PRESENT INVENTION EXAMPLE |
| 10 |   | 312 | 462 | 35 | 1.0 | 9.4 | 8.0 | 9.4 | 214 | 208 | 227 | 1.58 | PRESENT INVENTION EXAMPLE |
| 11 |   | 297 | 449 | 36 | 1.4 | 6.7 | 8.9 | 4.8 | 213 | 207 | 220 | 1.57 | COMPARATIVE EXAMPLE |
| 12 | D | 290 | 444 | 37 | 0.7 | 11.0 | 9.6 | 15.7 | 219 | 208 | 234 | 1.69 | PRESENT INVENTION EXAMPLE |
| 13 |   | 292 | 442 | 36 | 0.2 | 10.9 | 9.7 | 54.5 | 217 | 210 | 232 | 1.71 | PRESENT INVENTION EXAMPLE |
| 14 |   | 288 | 453 | 36 | 2.7 | 6.5 | 9.0 | 2.4 | 204 | 210 | 220 | 1.32 | COMPARATIVE EXAMPLE |
| 15 | E | 289 | 442 | 36 | 0.8 | 11.9 | 10.6 | 14.9 | 218 | 210 | 238 | 1.81 | PRESENT INVENTION EXAMPLE |
| 16 |   | 292 | 445 | 36 | 0.2 | 12.1 | 10.7 | 60.3 | 218 | 211 | 235 | 1.75 | PRESENT INVENTION EXAMPLE |
| 17 |   | 304 | 458 | 36 | 3.5 | 6.8 | 6.5 | 1.9 | 203 | 211 | 222 | 1.48 | COMPARATIVE EXAMPLE |
| 18 |   | 299 | 450 | 36 | 4.2 | 9.2 | 9.0 | 2.2 | 205 | 208 | 220 | 1.37 | COMPARATIVE EXAMPLE |
| 19 | F | 325 | 479 | 34 | 0.9 | 11.3 | 10.1 | 12.6 | 217 | 209 | 239 | 1.75 | PRESENT INVENTION EXAMPLE |
| 20 |   | 328 | 481 | 35 | 0.6 | 11.2 | 9.9 | 18.7 | 218 | 207 | 230 | 1.68 | PRESENT INVENTION EXAMPLE |
| 21 |   | 431 | 585 | 27 | 0.9 | 4.8 | 6.7 | 5.3 | 207 | 212 | 216 | 1.33 | COMPARATIVE EXAMPLE |
| 22 | G | 295 | 448 | 37 | 0.3 | 8.9 | 7.4 | 29.7 | 214 | 209 | 229 | 1.56 | PRESENT INVENTION EXAMPLE |
| 23 |   | 300 | 452 | 36 | 0.8 | 8.3 | 7.4 | 10.4 | 213 | 210 | 232 | 1.51 | PRESENT INVENTION EXAMPLE |
| 24 |   | 291 | 443 | 37 | 4.4 | 10.6 | 11.8 | 2.4 | 210 | 215 | 221 | 1.66 | COMPARATIVE EXAMPLE |
| 25 | H | 300 | 450 | 36 | 0.6 | 10.0 | 8.3 | 16.7 | 214 | 209 | 230 | 1.65 | PRESENT INVENTION EXAMPLE |
| 26 |   | 308 | 459 | 36 | 4.8 | 7.2 | 6.8 | 1.5 | 212 | 205 | 218 | 1.38 | COMPARATIVE EXAMPLE |
| 27 |   | 303 | 452 | 36 | 3.6 | 9.2 | 8.9 | 2.6 | 204 | 210 | 221 | 1.62 | COMPARATIVE EXAMPLE |
| 28 | I | 322 | 475 | 35 | 2.1 | 13.3 | 12.2 | 6.3 | 216 | 209 | 230 | 1.73 | PRESENT INVENTION EXAMPLE |
| 29 |   | 318 | 468 | 35 | 2.0 | 12.1 | 11.0 | 6.1 | 216 | 212 | 232 | 1.77 | PRESENT INVENTION EXAMPLE |
| 30 |   | 310 | 462 | 35 | 1.2 | 6.5 | 7.2 | 5.4 | 213 | 214 | 220 | 1.35 | COMPARATIVE EXAMPLE |
| 31 | J | 291 | 444 | 37 | 0.5 | 10.2 | 8.8 | 20.4 | 214 | 208 | 235 | 1.63 | PRESENT INVENTION EXAMPLE |
| 32 |   | 294 | 447 | 37 | 0.4 | 10.3 | 8.6 | 25.8 | 214 | 208 | 234 | 1.65 | PRESENT INVENTION EXAMPLE |
| 33 | K | 292 | 442 | 37 | 1.3 | 12.4 | 11.1 | 9.5 | 216 | 210 | 233 | 1.80 | PRESENT INVENTION EXAMPLE |
| 34 |   | 292 | 446 | 37 | 3.2 | 8.3 | 8.2 | 2.6 | 203 | 204 | 220 | 1.38 | COMPARATIVE EXAMPLE |
| 35 | L | 271 | 422 | 38 | 0.6 | 11.5 | 10.2 | 19.1 | 217 | 208 | 236 | 1.74 | PRESENT INVENTION EXAMPLE |
| 36 |   | 269 | 419 | 39 | 0.5 | 11.3 | 10.0 | 22.6 | 217 | 210 | 233 | 1.72 | PRESENT INVENTION EXAMPLE |
| 37 | M | 312 | 463 | 36 | 1.5 | 8.7 | 7.5 | 5.8 | 212 | 208 | 230 | 1.54 | PRESENT INVENTION EXAMPLE |
| 38 |   | 301 | 455 | 36 | 4.3 | 5.7 | 6.9 | 1.3 | 211 | 198 | 219 | 1.57 | COMPARATIVE EXAMPLE |
| 39 | N | 259 | 412 | 38 | 0.6 | 10.4 | 8.8 | 17.3 | 214 | 208 | 229 | 1.60 | PRESENT INVENTION EXAMPLE |
| 40 |   | 248 | 400 | 40 | 0.4 | 10.4 | 9.3 | 26.0 | 215 | 209 | 227 | 1.63 | PRESENT INVENTION EXAMPLE |
| 41 |   | 308 | 458 | 24 | 0.8 | 6.2 | 7.4 | 7.8 | 210 | 194 | 226 | 1.28 | COMPARATIVE EXAMPLE |
| 42 | O | 312 | 462 | 36 | 0.7 | 10.6 | 8.9 | 15.1 | 215 | 208 | 233 | 1.71 | PRESENT INVENTION EXAMPLE |
| 43 |   | 309 | 459 | 36 | 0.4 | 10.6 | 9.2 | 26.4 | 215 | 212 | 228 | 1.64 | PRESENT INVENTION EXAMPLE |
| 44 |   | 300 | 452 | 36 | 0.5 | 8.2 | 5.3 | 16.4 | 209 | 198 | 222 | 1.53 | COMPARATIVE EXAMPLE |
| 45 | P | 236 | 389 | 40 | 4.2 | 8.2 | 10.9 | 2.0 | 212 | 223 | 220 | 1.61 | COMPARATIVE EXAMPLE |
| 46 | Q | 322 | 474 | 34 | 3.9 | 5.9 | 6.2 | 1.5 | 206 | 218 | 216 | 1.23 | COMPARATIVE EXAMPLE |
| 47 | R | 311 | 462 | 35 | 2.8 | 5.3 | 6.8 | 1.9 | 206 | 218 | 220 | 1.15 | COMPARATIVE EXAMPLE |
| 48 | S | 262 | 413 | 39 | 3.8 | 7.2 | 9.3 | 1.9 | 212 | 215 | 215 | 1.65 | COMPARATIVE EXAMPLE |
| 49 | T | 298 | 478 | 29 | 0.3 | 5.8 | 6.3 | 19.3 | 208 | 211 | 219 | 1.18 | COMPARATIVE EXAMPLE |
| 50 | U | 288 | 442 | 37 | 3.2 | 6.5 | 9.8 | 2.0 | 207 | 215 | 219 | 1.42 | COMPARATIVE EXAMPLE |
| 51 | V | 400 | 433 | 25 | 0.3 | 7.6 | 11.2 | 25.3 | 211 | 198 | 231 | 1.13 | COMPARATIVE EXAMPLE |
| 52 | W | 378 | 453 | 23 | 1.2 | 5.8 | 8.9 | 4.8 | 208 | 195 | 237 | 1.32 | COMPARATIVE EXAMPLE |

(NOTICE) EACH UNDERLINE INDICATES CONDITION OUTSIDE THE RANGE OF THE PRESENT INVENTION.
[1] RANDOM INTENSITY RATIO (A) OF THE {332} <110> ORIENTATION
[2] RANDOM INTENSITY RATIO (B) OF THE {557} <9 16 5> ORIENTATION
[3] RANDOM INTENSITY RATIO (C) OF THE {111} <112> ORIENTATION

As is clear from the results shown in Table 3, in the case of the present invention examples in which the steel having the chemical components of the present invention was manufactured on the proper conditions (the present invention examples in the column of note in Tables 1 to 3), the Young's modulus in the rolling direction and in the 45° direction both became 206 GPa or more, the Young's modulus in the transverse direction became 225 GPa or more, and the average r value became 1.4 or more. Thereby, it is clear that the present invention examples are each high in rigidity and excellent in deep drawability.

On the other hand, Manufactures No. 45 to 52 are comparative examples using Steels No. P to W each having the chemical components falling outside the range of the present invention. Manufacture No. 45 and Manufacture No. 48 are an example of the case where (1) Expression was not able to be satisfied because the content of S was high in Manufacture No. 45 and the content of Mn was low in Manufacture No. 48. In this case, recovery during annealing was not suppressed sufficiently, so that the random intensity ratios (A) and (C) were intensified and no sufficient Young's modulus in the transverse direction was able to be obtained.

Manufacture No. 46 indicates an example of the case where no Ti is contained. In this case, TiN precipitation does not occur and a γ grain diameter becomes coarse, so that the random intensity ratio (A) increases. Additionally, at the stage of the hot-rolled sheet, solid-solution C remains, so that the random intensity ratio (A) further develops but the development of the random intensity ratios (B) and (C) is suppressed, resulting in that the Young's modulus in the transverse direction decreases and the r value also deteriorates.

Manufacture No. 47 is the case where the added amount of C is too high. In this case, solid-solution C remains in the hot-rolled sheet, so that development of all the orientations of the random intensity ratios (A), (B), and (C) is suppressed.

Manufacture No. 49 is an example of the case where Mn is too high. In this case, recrystallization is delayed, the random intensity ratios (B) and (C) become weak, the Young's modulus in the transverse direction cannot be satisfied, and the r value also decreases.

Manufacture No. 50 is the case where the amount of B is small. In this case, recovery is not suppressed, so that the random intensity ratio (C) develops and the random intensity ratio (B) decreases, and thus it is not possible to satisfy the Young's modulus in the transverse direction.

Manufacture No. 51 is the case where the added amount of Ti is too high, and Manufacture No. 52 is the case where the added amount of B is too high. In each of these cases, the recrystallization temperature when annealing becomes too high, so that workability deteriorates, the random intensity ratio (B) becomes weak, the Young's modulus in the 45° direction decreases, and the r value also decreases.

As is Manufacture No. 3 with Steel No. A being a comparative example, when the heating rate 2 is too large, the r value decreases and the random intensity ratio (A) develops, so that the Young's modulus in the transverse direction and in the rolling direction decrease.

As is Manufacture No. 4 with Steel No. A being a comparative example, when the shape ratio 1 is too high, the r value decreases and the random intensity ratio (B) does not develop, so that the Young's modulus in the transverse direction and in the rolling direction decrease.

As is Manufacture No. 7 with Steel No. B being a comparative example, when the time period t until start of cooling after final finish rolling is too long, the random intensity ratio (A) develops, so that the Young's modulus in the transverse direction and in the rolling direction decrease.

As is Manufacture No. 8 with Steel No. B being a comparative example, when the heating rate 2 is too small, the r value decreases and the random intensity ratio (B) does not develop, so that the Young's modulus in the transverse direction and in the rolling direction decrease.

As is Manufacture No. 11 with Steel No. C being a comparative example, when the shape ratio of the hot rolling final pass is too low, no sufficient shear deformation is introduced and the random intensity ratio (B) does not develop, so that the Young's modulus in the transverse direction decreases.

As is Manufacture No. 14 with Steel No. D being a comparative example, when the shape ratio 1 is too high, the r value decreases and the random intensity ratio (B) does not develop, so that the Young's modulus in the transverse direction and in the rolling direction decrease.

As is Manufacture No. 17 with Steel No. E being a comparative example, when the heating temperature is low to make it impossible to secure sufficient F0T and FT, the random intensity ratio (B) is intensified, but the random intensity ratio (C) becomes weak, so that the r value cannot be secured.

As is Manufacture No. 18 with Steel No. E being a comparative example, when the heating rate 2 is too large, the r value decreases and the random intensity ratio (A) develops, so that the Young's modulus in the transverse direction and in the rolling direction decrease.

As is Manufacture No. 21 with Steel No. F being a comparative example, when the annealing temperature is too high, the annealing results in γ-region annealing, so that the texture becomes weak and the Young's modulus and the r value both decrease.

As is Manufacture No. 24 with Steel No. G being a comparative example, when F0T and FT are too high, the random intensity ratio (A) is intensified too much, so that the Young's modulus in the transverse direction decreases.

As is Manufacture No. 26 with Steel No. H being a comparative example, when the cooling rate after hot rolling is small and the cold rolling ratio is low, the random intensity ratio (A) is intensified too much and the random intensity ratios (B) and (C) become weak, so that the Young's modulus and the r value both decrease.

As is Manufacture No. 27 with Steel No. H being a comparative example, when the time period t until start of cooling after final finish rolling is too long, the random intensity ratio (A) develops, so that the Young's modulus in the transverse direction and in the rolling direction decrease.

As is Manufacture No. 30 with Steel No. I being a comparative example, when the coiling temperature is too low, solid-solution C remains in the hot-rolled sheet, so that the random intensity ratios (B) and (C) do not develop sufficiently, the Young's modulus decreases, and the r value also deteriorates.

As is Manufacture No. 34 with Steel No. K being a comparative example, when the coiling temperature increases too much and the cold rolling ratio increases too much, the random intensity ratio (A) is intensified too much and the integration degree of the {100}<012> orientation to decrease the absolute values of the r value and the Young's modulus increases, resulting in that both the r value and the Young's modulus cannot be secured.

As is Manufacture No. 38 with Steel No. M being a comparative example, when the heating rate when annealing (the heating rates 1 and 2) is too fast, the {112}<110> orientation is intensified and the random intensity ratio (B) becomes weak, and thereby the Young's modulus in the 45° direction decreases and the r value also deteriorates.

As is Manufacture No. 41 with Steel No. N being a comparative example, when the annealing temperature is too low, recrystallization does not progress sufficiently and non-recrystallization remains, so that ductility decreases, and the Young's modulus in the 45° direction and the r value deteriorate.

As is Manufacture No. 44 with Steel No. O being a comparative example, when the shape ratio 2 is too high, after cold rolling and annealing, the random intensity ratio (B) does not develop as compared to the random intensity ratio (C), so that the Young's modulus in the transverse direction decreases.

From the results of the examples explained above, it is clear that the present invention enables the cold-rolled steel sheet excellent in rigidity and deep drawability, the electrogalvanized cold-rolled steel sheet, the hot-dip galvanized cold-rolled steel sheet, and the alloyed hot-dip galvanized cold-rolled steel sheet to be fabricated.

INDUSTRIAL APPLICABILITY

The cold-rolled steel sheet of the present invention is used for, for example, automobiles, home electric appliances, buildings, and so on. Further, the cold-rolled steel sheet of the present invention includes narrowly-defined cold-rolled steel sheets without a surface treatment performed thereon and broadly-defined cold-rolled steel sheets with a surface treatment such as hot-dip Zn plating, alloying hot-dip Zn plating, or electrogalvanizing performed thereon for the purpose of rust prevention. This surface treatment includes aluminum-based plating, forming of an organic coating film and an inorganic coating film on surfaces of various plated steel sheets, coating, and treatments combined with them. Then, the cold-rolled steel sheet of the present invention has a high Young's modulus, and thus as compared to a conventional steel sheet, a decrease in sheet thickness, namely a reduction in weight can be achieved, and it is possible to contribute to global environmental conservation. Further, the cold-rolled steel sheet of the present invention is also improved in shape fixability, so that application of a high-strength steel sheet to a pressed part such as an automobile member is facilitated. Further, members obtained by forming and working the steel sheet of the present invention are also excellent in collision energy absorbing property, to thus contribute also to safety improvement of automobiles, resulting in that social contributions are immeasurable.

The invention claimed is:

1. A cold-rolled steel sheet, comprising:
in mass %,
C: 0.0005 to 0.0045%;
Mn: 0.80 to 2.50%;
Ti: 0.002 to 0.150%;
B: 0.0005 to 0.01%;
Si: 0 to 1.0%;
Al: 0 to 0.10%;
Nb: 0 to 0.040%;
Mo: 0 to 0.500%;
Cr: 0 to 3.000%;
W: 0 to 3.000%;
Cu: 0 to 3.000%;
Ni: 0 to 3.000%;
Ca: 0 to 0.1000%;
Rem: 0 to 0.1000%;
V: 0 to 0.100%;
P: 0.15% or less;
S: 0.010% or less;
N: 0.006% or less,
in which (1) Expression below is satisfied, and
a balance comprising iron and impurities, wherein
at the position of ¼ thickness of a sheet thickness, a random intensity ratio (A) of the {332}<110> orientation is 3 or less, a random intensity ratio (B) of the {557}<9 16 5> orientation and a random intensity ratio (C) of the {111}<112> orientation are both 7 or more, and {(B)/(A)≥5} and {(B)>(C)} are satisfied, $$0.07 \le (Mn(\text{mass \%}) - Mn^*(\text{mass \%}))/(B(\text{ppm}) - B^*(\text{ppm})) \le 0.2 \quad (1),$$

(1) Expression above is set as follows:
Mn*(mass %)=55S(mass %)/32,
B*(ppm)=10(N(mass %)−14Ti(mass %)/48)/14×10000, and
in the case of B*<0, B* is set to 0.

2. The cold-rolled steel sheet according to claim 1, comprising:
one or two of, in mass %,
Si: 0.01 to 1.0%; and
Al: 0.010 to 0.10%.

3. The cold-rolled steel sheet according to claim 1, comprising:
in mass %,
Nb: 0.005 to 0.040%.

4. The cold-rolled steel sheet according to claim 1, comprising:
one or two or more of, in mass %,
Mo: 0.005 to 0.500%;
Cr: 0.005 to 3.000%;
W: 0.005 to 3.000%;
Cu: 0.005 to 3.000%; and
Ni: 0.005 to 3.000%.

5. The cold-rolled steel sheet according to claim 1, comprising:
one or two or more of, in mass %,
Ca: 0.0005 to 0.1000%;
Rem: 0.0005 to 0.1000%; and
V: 0.001 to 0.100%.

6. The cold-rolled steel sheet according to claim 1, wherein a Young's modulus in a rolling perpendicular direction is 225 GPa or more, a Young's modulus in a rolling direction and a Young's modulus in a 45° direction with respect to the rolling direction are both 206 GPa or more, and an average r value is 1.4 or more.

7. An electrogalvanized cold-rolled steel sheet, wherein on the surface of the cold-rolled steel sheet according to claim 1, electrogalvanizing is performed.

8. A hot-dip galvanized cold-rolled steel sheet, wherein on the surface of the cold-rolled steel sheet according to claim 1, hot-dip galvanizing is performed.

9. An alloyed hot-dip galvanized cold-rolled steel sheet, wherein
on the surface of the cold-rolled steel sheet according to claim 1, alloying hot-dip galvanizing is performed.

* * * * *